(12) United States Patent
Lukacs

(10) Patent No.: US 10,140,448 B2
(45) Date of Patent: *Nov. 27, 2018

(54) SYSTEMS AND METHODS OF ASYNCHRONOUS ANALYSIS OF EVENT NOTIFICATIONS FOR COMPUTER SECURITY APPLICATIONS

(71) Applicant: Bitdefender IPR Management Ltd., Nicosia (CY)

(72) Inventor: Sandor Lukacs, Floresti (RO)

(73) Assignee: Bitdefender IPR Management Ltd., Nicosia (CY)

( * ) Notice: Subject to any disclaimer, the term of this patent is extended or adjusted under 35 U.S.C. 154(b) by 218 days.

This patent is subject to a terminal disclaimer.

(21) Appl. No.: 15/201,035

(22) Filed: Jul. 1, 2016

(65) Prior Publication Data

US 2018/0004943 A1 Jan. 4, 2018

(51) Int. Cl.
*G06F 21/52* (2013.01)
*G06F 21/55* (2013.01)
*G06F 9/54* (2006.01)
*G06F 9/455* (2018.01)

(52) U.S. Cl.
CPC ........ *G06F 21/554* (2013.01); *G06F 9/45558* (2013.01); *G06F 9/542* (2013.01); *G06F 21/52* (2013.01); *G06F 2009/45587* (2013.01); *G06F 2221/033* (2013.01)

(58) Field of Classification Search
CPC .......... G06F 21/52; G06F 21/53; G06F 21/54; G06F 21/55; G06F 21/554; G06F 9/45558; G06F 9/542; G06F 2009/45587
See application file for complete search history.

(56) References Cited

U.S. PATENT DOCUMENTS 5,826,084 A 10/1998 Brooks et al.
5,828,882 A * 10/1998 Hinckley ................ G06F 9/542
719/318

(Continued)

FOREIGN PATENT DOCUMENTS

WO 2009151888 A2 12/2009

OTHER PUBLICATIONS

McDowell et al., "Pacifica-Next Generation Architecture for Efficient Virtual Machines," Presentation at WinHEC 2005, Advanced Micro Devices, p. 1-29, Sunnyvale, CA, Apr. 2005.

(Continued)

*Primary Examiner* — Linglan E Edwards
(74) *Attorney, Agent, or Firm* — Law Office of Andrei D Popovici, PC

(57) ABSTRACT

Described systems and methods enable an efficient detection and analysis of software events, especially in hardware virtualization configurations. In some embodiments, certain types of events are analyzed asynchronously, in the sense that the triggering entity is allowed to continue execution while the respective event is added to a queue for later processing. Some embodiments modify the instruction set architecture of the processor by adding a processor instruction dedicated to delivering event notifications. Such notification instructions allow for complex and flexible event detection without some of the disadvantages of conventional methods such as hooking.

21 Claims, 12 Drawing Sheets

(56) References Cited

U.S. PATENT DOCUMENTS

| | | | |
|---|---|---|---|
| 6,631,363 B1* | 10/2003 | Brown | G06F 9/542 370/401 |
| 7,418,584 B1 | 8/2008 | Klaiber et al. | |
| 7,457,914 B2* | 11/2008 | Cordella | G06F 9/542 711/112 |
| 7,657,419 B2 | 2/2010 | van der Made | |
| 7,685,635 B2 | 3/2010 | Vega et al. | |
| 7,716,676 B2* | 5/2010 | Sawicki | G06F 9/542 715/234 |
| 7,748,039 B2 | 6/2010 | Obrecht et al. | |
| 8,065,728 B2 | 11/2011 | Wang et al. | |
| 8,099,596 B1 | 1/2012 | Rusakov et al. | |
| 8,561,060 B2 | 10/2013 | Serebrin et al. | |
| 8,578,080 B2* | 11/2013 | Sahita | G06F 13/24 710/260 |
| 8,578,345 B1 | 11/2013 | Kennedy et al. | |
| 8,650,650 B1 | 2/2014 | Pavlyushchik | |
| 8,762,948 B1 | 6/2014 | Zaitsev | |
| 8,863,283 B2* | 10/2014 | Sallam | G06F 21/554 726/23 |
| 8,935,791 B2 | 1/2015 | Martynenko et al. | |
| 9,002,771 B2* | 4/2015 | Gartside | G06N 5/025 706/47 |
| 9,015,704 B2 | 4/2015 | Vandegrift et al. | |
| 9,323,931 B2 | 4/2016 | Lukacs et al. | |
| 2004/0117532 A1 | 6/2004 | Bennett et al. | |
| 2004/0168157 A1 | 8/2004 | Hundt et al. | |
| 2005/0091652 A1 | 4/2005 | Ross et al. | |
| 2005/0251803 A1 | 11/2005 | Turner et al. | |
| 2010/0031353 A1 | 2/2010 | Thomas et al. | |
| 2010/0031360 A1 | 2/2010 | Seshadri et al. | |
| 2010/0107252 A1 | 4/2010 | Mertoguno | |
| 2011/0083176 A1 | 4/2011 | Martynenko et al. | |
| 2011/0213765 A1 | 9/2011 | Cui et al. | |
| 2011/0258610 A1 | 10/2011 | Aaraj et al. | |
| 2011/0307955 A1 | 12/2011 | Kaplan et al. | |
| 2012/0254993 A1 | 10/2012 | Sallam | |
| 2012/0255012 A1 | 10/2012 | Sallam | |
| 2012/0324575 A1 | 12/2012 | Choi et al. | |
| 2013/0340077 A1 | 12/2013 | Salsamendi et al. | |
| 2014/0053272 A1 | 2/2014 | Lukacs et al. | |
| 2014/0130158 A1 | 5/2014 | Wang et al. | |
| 2014/0189687 A1 | 7/2014 | Jung et al. | |
| 2014/0215226 A1 | 7/2014 | Litty et al. | |
| 2015/0074806 A1 | 3/2015 | Roundy et al. | |
| 2015/0121135 A1 | 4/2015 | Pape | |
| 2015/0186643 A1 | 7/2015 | Tu et al. | |
| 2015/0319182 A1 | 11/2015 | Natarajan et al. | |
| 2015/0379279 A1 | 12/2015 | Feroz et al. | |

OTHER PUBLICATIONS

Faydoc, "CMPXCHG8B—Compare and Exchange 8 Bytes," Intel Pentium Instruction Set Reference, p. 1, archive.org indicates the webpage was available on Nov. 15, 2006.

Beck et al., "Syscall Interception in Xen Hypervisor," HAL, p. 1-23, Inria, Rocquencourt, France, Nov. 10, 2009.

AMD, "AMD64 Architecture Programmer's Manual vol. 2: System Programming," AMD64 Technology, Advanced Micro Devices, p. 1-86, Sunnyvale, CA, May 2013.

Jurczyk, Mateusz, "Windows X86 System Call Table (NT/2000/XP/2003/Vista/2008/7/8)," p. 1-7, Team Vexillium, Poland, archive.org indicates the webpage was available on Dec. 1, 2013.

Jeschke, Rene, "LDS/LESJLFD/LGS/LSS: Load Far Pointer," x86 Instruction Set Reference, p. 1, archive.org indicates the webpage was available on Jul. 27, 2014.

Intel, "Intel Architecture Instruction Set Extensions Programming Reference," Intel Corporation, p. 1-30, Santa Clara, CA, Oct. 2014.

Intel, "VMCALL", Intel Corporation, Intel 64 and IA-32 Architecture Software Developer's Manual, Combined vols. 1, 2A, 2B, 3A, 3B, and 3C, p. 3032-3033, Santa Clara, CA, Jan. 2015.

World of Computing "Instructions in Microprocessor", 4 pages, http://www.worldofcomputing.net/processor/instructions-in-microprocessor.html, date listed on PTO-892 as Apr. 7, 2013.

Whatis "no op (no operation)", retrieved from http://whatis.techtarget.com/definition/no-op-no-operation, date listed on PTO-892 as Mar. 24, 2011.

Lukacs, U.S. Appl. No. 14/665,888, filed Mar. 23, 2015.
Lukacs, U.S. Appl. No. 14/665,917, filed Mar. 23, 2015.
Lukacs, U.S. Appl. No. 14/665,856, filed Mar. 23, 2015.
Lukacs, U.S. Appl. No. 15/209,317, filed Jul. 13, 2016.

USPTO, Office Action dated May 6, 2016 for U.S. Appl. No. 14/665,888, filed Mar. 23, 2015.

USPTO, Office Action dated Jun. 27, 2016 for U.S. Appl. No. 14/665,917, filed Mar. 23, 2015.

USPTO, Office Action dated May 4, 2016 for U.S. Appl. No. 14/665,856, filed Mar. 23, 2015.

European Patent Office, International Search Report and Written Opinion dated Oct. 7, 2016 for PCT International Application No. PCT/EP2016/066745, international filing date Jul. 14, 2016, priority date Jul. 14, 2015.

* cited by examiner

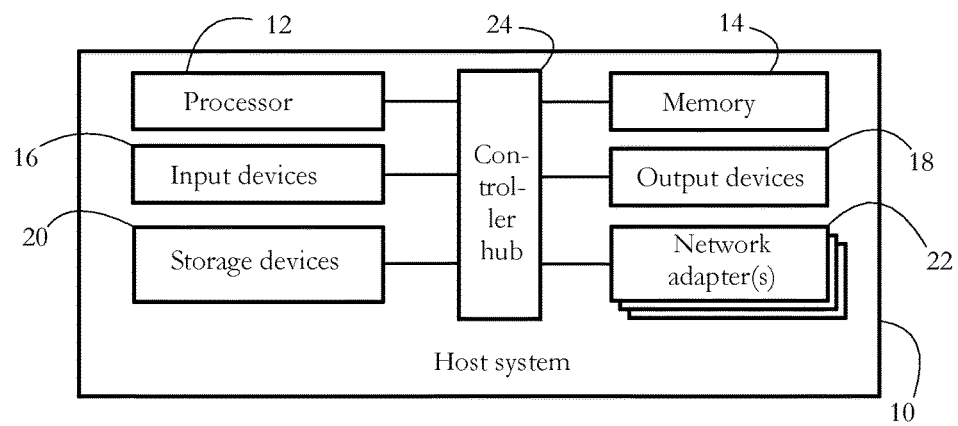
FIG. 1
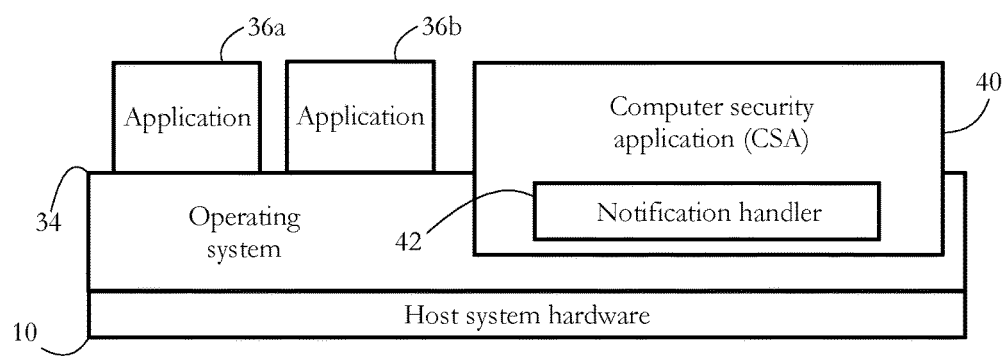
FIG. 2-A

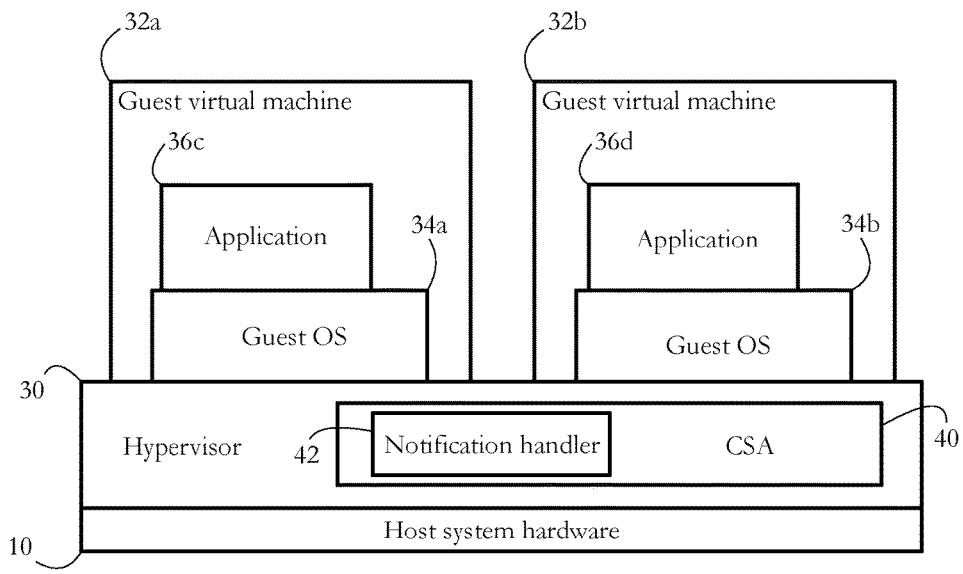
FIG. 2-B
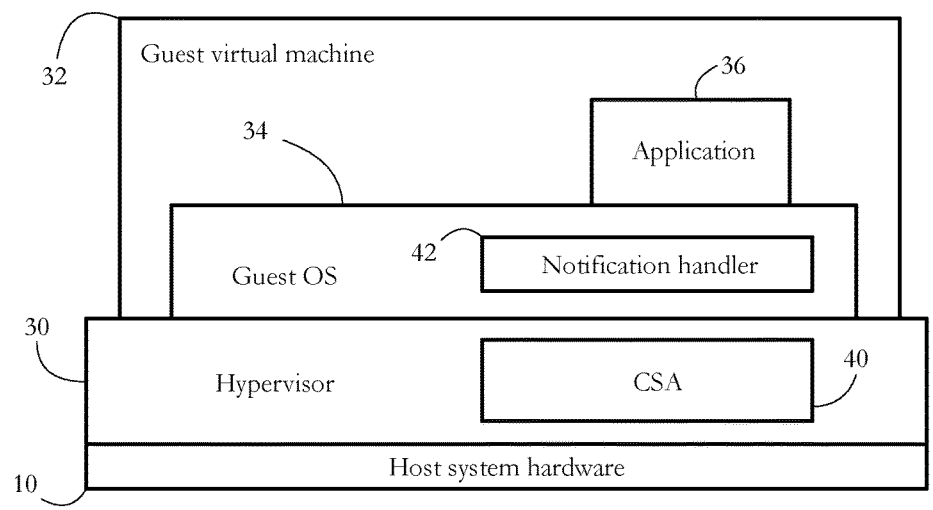
FIG. 2-C

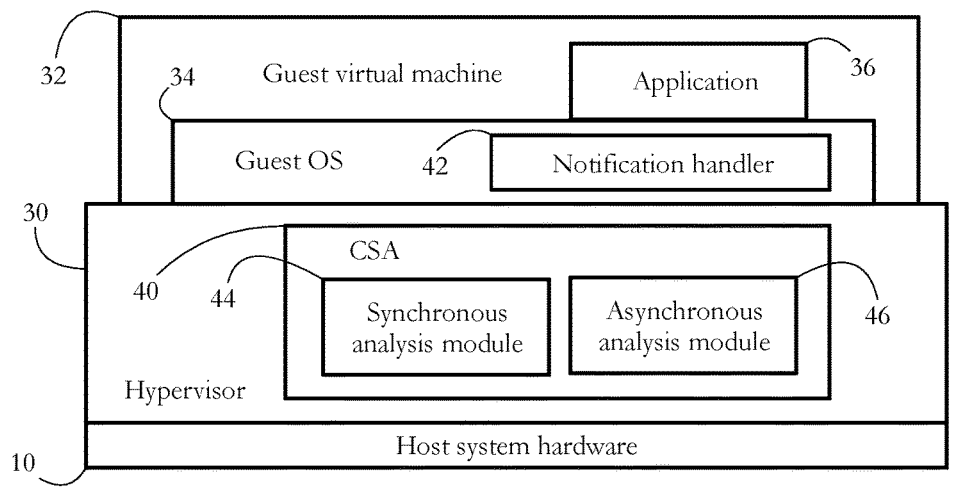
FIG. 3-A
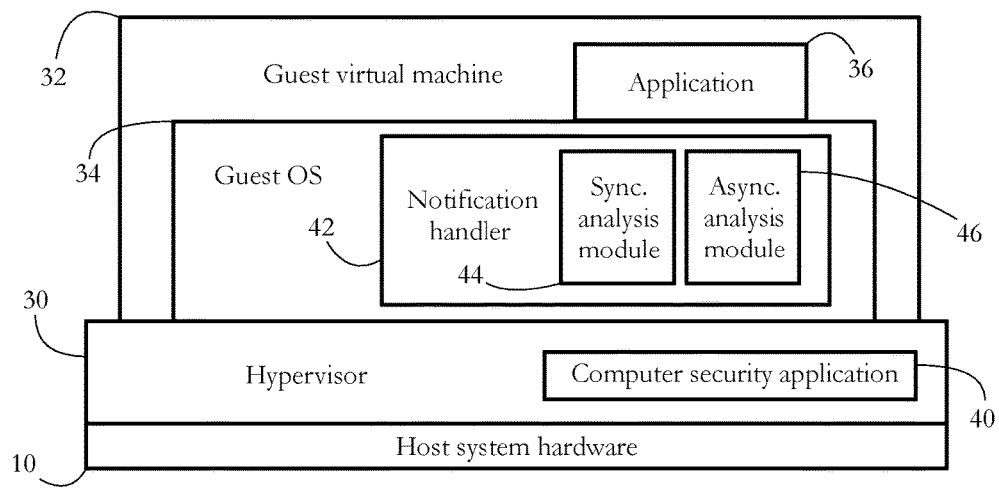
FIG. 3-B

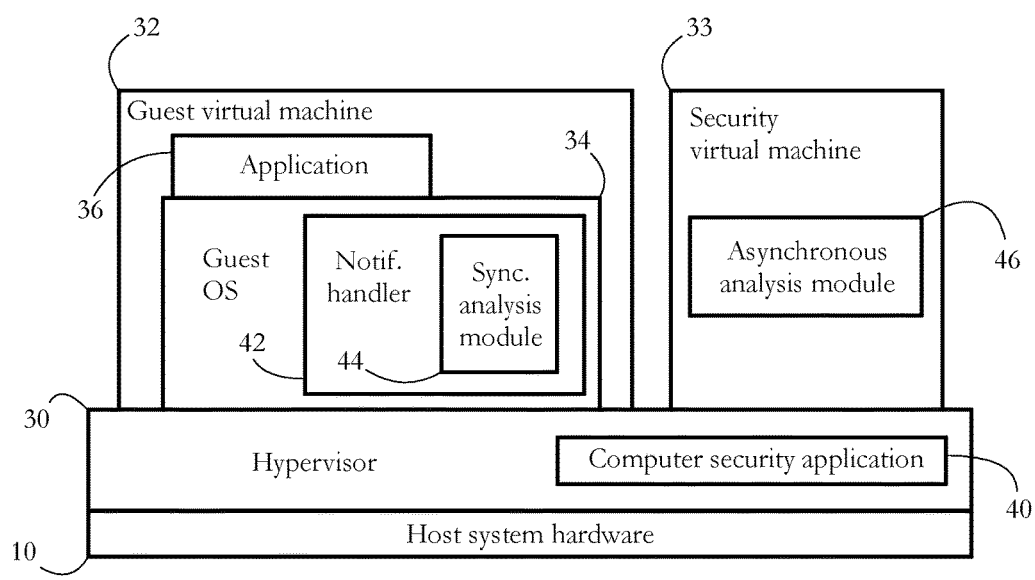
FIG. 3-C

SYSTEMS AND METHODS OF ASYNCHRONOUS ANALYSIS OF EVENT NOTIFICATIONS FOR COMPUTER SECURITY APPLICATIONS

RELATED APPLICATIONS

This application claims the benefit of the filing date of U.S. provisional patent application No. 62/188,642, filed on Jul. 4, 2015, entitled "Systems and Methods of Asynchronous Analysis of Event Notifications for Computer Security Applications," the entire contents of which are incorporated by reference herein.

BACKGROUND

The invention relates to computer security systems and methods, and in particular, to systems and methods for protecting hardware virtualization environments from computer security threats.

Malicious software, also known as malware, affects a great number of computer systems worldwide. In its many forms such as computer viruses, worms, rootkits, and spyware, malware presents a serious risk to millions of computer users, making them vulnerable to loss of data and sensitive information, identity theft, and loss of productivity, among others. Computer security software may be used to protect computer systems from malicious software.

Several conventional computer security systems and methods employ a notification mechanism, wherein a module detects the occurrence of an event within a monitored host system or virtual machine, and notifies security software. The security software may then analyze the respective event to determine whether it indicates a potential security threat, such as malicious software, an intrusion, etc. Some prior art methods include suspending execution of the entity that triggered the respective event, while the event is analyzed. Such suspensions may negatively impact user experience.

Conventional security software may detect the occurrence of certain events using intrusive actions, such as modifying certain functions of the operating system (a technique commonly known as hooking). Hooking may be detected and disabled by malicious software, and may create performance and stability problems for the respective computer system.

There is a substantial interest in improving the efficiency of computer security operations, e.g., in developing systems and methods that address the above shortcomings related to event detection and analysis.

SUMMARY

According to one aspect, a host system comprises a hardware processor and a memory, the hardware processor configured to execute a notification handler and a computer security program. The hardware processor further configured to receive from the memory an event notification instruction forming part of a currently executing process, wherein execution of the process causes an occurrence of a trigger event, wherein the event notification instruction comprises an operator field and an operand field, wherein the operand field comprises an identifier of an event type of the trigger event. The hardware processor is further configured, in response to receiving the event notification instruction, to suspend execution of the process, and in response to suspending execution of the process, to switch to executing the notification handler. The notification handler is configured to determine whether an event eligibility condition is satisfied according to the event type of the trigger event. The notification handler is further configured, when the event eligibility condition is satisfied, to insert an event indicator into an event queue, the event indicator indicative of the trigger event, and in response to inserting the event indicator into the event queue, to instruct the hardware processor to resume execution of the process. The computer security program is configured, in response to the hardware processor resuming execution of the process, to remove the event indicator from the queue, and to determine according to the event indicator whether the occurrence of the trigger event is indicative of a computer security threat.

According to another aspect, a non-transitory computer-readable medium stores processor instructions which, when executed by a hardware processor of a host system, cause the host system to form a notification handler and a computer security program. The hardware processor is configured to receive from a memory of the host system an event notification instruction forming part of a currently executing process, wherein execution of the process causes an occurrence of a trigger event, wherein the event notification instruction comprises an operator field and an operand field, wherein the operand field comprises an identifier of an event type of the trigger event. The hardware processor is further configured, in response to receiving the event notification instruction, to suspend execution of the process, and in response to suspending execution of the process, to switch to executing the notification handler. The notification handler is configured to determine whether an event eligibility condition is satisfied according to the event type of the trigger event. The notification handler is further configured, in response, when the event eligibility condition is satisfied, to insert an event indicator into an event queue, the event indicator indicative of the trigger event. The notification handler is further configured, in response to inserting the event indicator into the event queue, to instruct the hardware processor to resume execution of the process. The computer security program is configured, in response to the hardware processor resuming execution of the process, to remove the event indicator from the queue, and to determine according to the event indicator whether the occurrence of the trigger event is indicative of a computer security threat.

According to another aspect, a method of protecting a host system against computer security threats, the host system comprising a hardware processor and a memory, comprises employing the hardware processor to receive from the memory an event notification instruction forming part of a process, wherein executing the process would cause an occurrence of a trigger event, the event notification instruction comprising an operator field and an operand field, wherein the operand field comprises an identifier of an event type of the trigger event. The method further comprises, in response to receiving the event notification instruction, employing the hardware processor to suspend execution of the process. The method further comprises, in response to suspending execution of the process, employing the hardware processor to determine whether an event eligibility condition is satisfied according to the event type of the trigger event, and in response, when the event eligibility condition is satisfied, employing the hardware processor to insert an event indicator into an event queue, the event indicator indicative of the trigger event. The method further comprises, in response to inserting the event indicator into the event queue, employing the hardware processor to resume execution of the process. The method further comprises, in response to resuming execution of the process, employing the hardware processor to remove the event indicator from the queue, and employing the hardware processor to determine according to the event indicator whether the occurrence of the trigger event is indicative of a computer security threat.

BRIEF DESCRIPTION OF THE DRAWINGS

The foregoing aspects and advantages of the present invention will become better understood upon reading the following detailed description and upon reference to the drawings where:

FIG. 1 illustrates an exemplary hardware configuration of a host system protected against computer security threats according to some embodiments of the present invention.

FIG. 2-A shows an exemplary computer security application (CSA) having a notification handler, the computer security application protecting the host system according to some embodiments of the present invention, in a configuration that does not involve hardware virtualization.

FIG. 2-B shows an alternative configuration according to some embodiments of the present invention, wherein an exemplary set of protected virtual machines are exposed by a hypervisor executing on the host system, and wherein the CSA and notification handler execute outside the protected virtual machine(s).

FIG. 2-C shows an alternative configuration according to some embodiments of the present invention, wherein the notification handler executes within the protected virtual machine.

FIG. 3-A shows an exemplary CSA having a synchronous analysis module and an asynchronous analysis module, the asynchronous analysis module executing at the level of the hypervisor according to some embodiments of the present invention.

FIG. 3-B shows an alternative configuration, wherein the asynchronous analysis module executes within the protected virtual machine according to some embodiments of the present invention.

FIG. 3-C shows yet another exemplary configuration, wherein the asynchronous analysis module executes within a security virtual machine distinct from the protected virtual machine, according to some embodiments of the present invention.

DETAILED DESCRIPTION OF PREFERRED EMBODIMENTS

Figure 4:
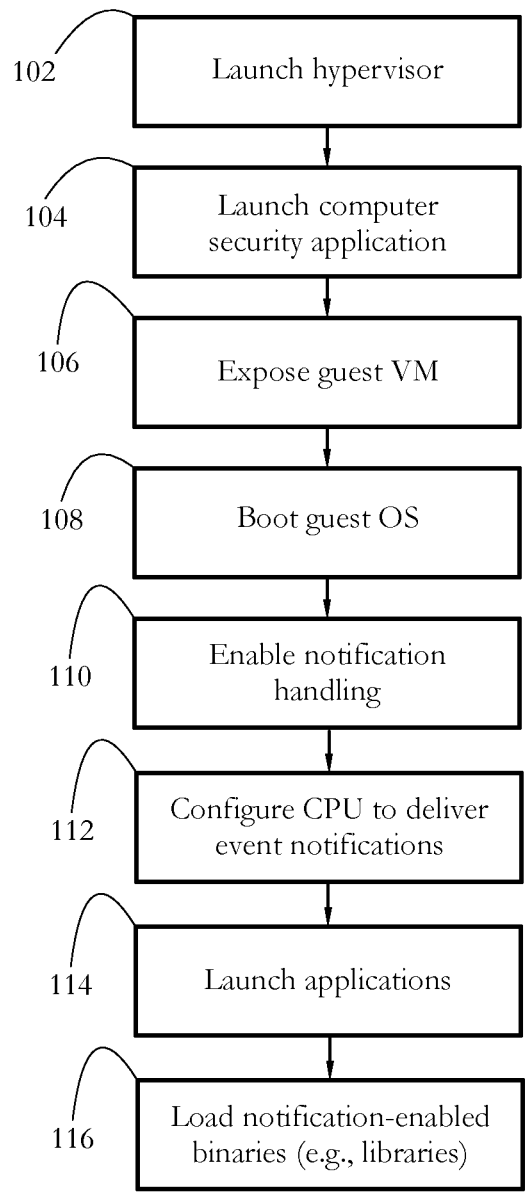
FIG. 4 shows an exemplary sequence of steps performed to set up computer security protection in some embodiments of the present invention.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, unintended or unauthorized modification of data and/or hardware, and destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a guest process is a process executing within a virtual machine. A process is said to execute within a virtual machine when it executes on a virtual processor of the respective virtual machine. Unless otherwise specified, a page represents the smallest unit of virtual memory that can be individually mapped to a physical memory of a host system. The term "logic" encompasses hardware circuitry having a fixed or a reconfigurable functionality (e.g., field-programmable gate array circuits), but does not encompass software emulating such functionality on a general-purpose computer. Unless otherwise specified, a register represents a storage component integrated on a common semiconductor substrate with, or forming part of a processor, and distinct from random-access memory (RAM). Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

FIG. 1 shows an exemplary hardware configuration of a host system 10 protected against computer security threats according to some embodiments of the present invention. Host system 10 may represent any electronic device having a processor and a memory. Exemplary host systems 10 include personal computers, servers, laptops, tablet computers, mobile telecommunication devices (e.g., smartphones), media players, TVs, game consoles, home appliances (e.g., refrigerators, thermostats, intelligent heating and/or lighting systems), and wearable devices (e.g. smartwatches, sports and fitness equipment), among others.

FIG. 1 illustrates a computer system; the hardware configuration of other host systems, such as smartphones and smartwatches, may differ from the illustrated configuration. Host system 10 comprises a set of physical devices, including a processor 12 and a memory unit 14. In some embodiments, processor 12 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 12 in the form of a sequence of processor instructions (e.g. machine code or other type of encoding). Memory unit 14 may comprise volatile computer-readable media (e.g. DRAM, SRAM) storing instructions and/or data accessed or generated by processor 12.

Depending on the type and performance of device, host system 10 may further comprise a set of input devices 16, such as a keyboard, mouse, touchscreen, etc., enabling a user to input data and/or instructions to host system 10. A set of output devices 18, such as a monitor or liquid crystal display, may convey information to the user, e.g., via a graphical user interface. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems. Controller hub 24 generically represents the plurality of system, peripheral, and/or chipset buses, and/or all other circuitry enabling the communication between processor 12 and devices 14, 16, 18, 20 and 22. For instance, controller hub 24 may include a memory management unit (MMU), an input/output (I/O) controller, and an interrupt controller, among others. In another example, controller hub 24 may comprise a northbridge connecting processor 12 to memory 14 and/or a southbridge connecting processor 12 to devices 16, 18, 20, and 22. In some embodiments, controller hub 24 may be integrated, in part or entirely, with processor 12, e.g., the MMU may share a common semiconductor substrate with processor 12.

A computer security application (CSA) 40 protects host system 10 against computer security threats such as malware, spyware, unwanted adware, etc. In some embodiments, CSA 40 is configured to monitor the behavior of a plurality of executable entities (e.g., processes, threads, applications), and to determine whether any such monitored entity is malicious according to its behavior. Monitored entities may include components of an operating system and user applications, among others.

FIGS. 2-A-B-C show exemplary software configurations according to some embodiments of the present invention. In the example of FIG. 2-A, host system 10 executes an operating system (OS) 34, a set of exemplary applications 36a-b, and CSA 40. Applications 36a-b generically represent any computer program such as word processing, image processing, media player, database, calendar, personal contact management, browser, gaming, voice communication, and data communication applications, among others. Operating system 34 may comprise any widely available operating system such as Microsoft Windows®, MacOS®, Linux®, iOS®, or Android®, among others. OS 34 provides an interface between applications 36a-b and the hardware of host system 10. The illustrated position of CSA 40 indicates that CSA 40 may execute at various processor privilege levels. For instance, a part of CSA 40 may execute at the processor privilege of the OS kernel (e.g., ring 0, kernel mode), while other parts may execute at the processor privilege of applications 36a-b (e.g., ring 3, user mode).

FIGS. 2-B-C show alternative embodiments of the present invention, wherein host system 10 uses hardware virtualization technology to operate a set of guest virtual machines. Hardware virtualization is often used in applications such as cloud computing and server consolidation, among others uses. A virtual machine (VM) emulates an actual physical machine/computer system, and is capable of running an operating system and other applications. In some embodiments, a hypervisor 30 executes on host system 10, hypervisor 30 configured to create or enable a plurality of virtualized devices, such as a virtual processor and a virtual memory management unit, and to present such virtualized devices to other software, in place of the real, physical devices of host system 10. Such operations are commonly known in the art as exposing a virtual machine. Hypervisor 30 may further enable multiple virtual machines to share the hardware resources of host system 10, so that each VM operates independently and is unaware of other VMs executing concurrently executing on host system 10. Examples of popular hypervisors include the VMware vSphere™ from VMware Inc. and the open-source Xen hypervisor, among others.

FIG. 2-B shows a set of guest VMs 32a-b exposed on host system 10. Each VM 32a-b includes a virtualized processor, and may further include other virtualized devices such virtualized input, output, storage, and network devices, as well as virtualized controller, among others. Each virtualized processor comprises an emulation of at least some of the functionality of hardware processor 12, and is configured to receive processor instructions for execution. Software using the respective virtual processor for execution is said to execute within the respective virtual machine. For instance, in the example of FIG. 2-B, guest OS 34a and application 36c are said to execute within guest VM 32a. In contrast, hypervisor 30 is said to execute outside, or below, guest VMs 32a-b. Each virtualized processor may interact with such virtualized devices as it would with the corresponding physical devices. For instance, software executing within VM 32a may send and/or receive network traffic via virtualized network adapter(s) of VM 32a. In some embodiments, hypervisor 30 may expose only a subset of virtualized devices to each guest VM, and may give a selected guest VM direct and exclusive use of some hardware devices of host system 10. In one such example, VM 32a may have exclusive use of input devices 16 and output devices 18, but lack a virtualized network adapter. Meanwhile, VM 32b may have direct and exclusive use of network adapter(s) 22. Such configurations may be implemented, for instance, using VT-d® technology from Intel®.

Each VM 32a-b executes a guest operating system (OS) 34a-b, respectively. Each OS 34a-b provides an interface between applications 36c-d executing within the respective VM and the virtualized hardware devices of the respective VM. In the exemplary embodiment of FIGS. 2-B-C, CSA 40 executes outside the guest VMs, and is configured to protect the respective guest VMs from computer security threats. A single computer security application may protect a plurality of virtual machines. CSA 40 may be incorporated into hypervisor 30, for instance as a library, or may be delivered as a computer program distinct and independent from hypervisor 30, but executing at the processor privilege level of hypervisor 30 (e.g., root mode, ring −1). CSA 40 may be a process having a separate scheduled execution thread, or may operate as a collection of unscheduled code objects executing when triggered by certain notification events, as illustrated further below.

The term "introspection" is used herein to denote some activities performed by CSA 40. Generically, introspection refers to gathering information about software executing within a virtual machine. Examples of introspection include, among others, determining whether software executing within the respective VM performs certain actions, such as executing certain processor instructions, accessing certain hardware resources, using certain services of the OS, accessing certain memory locations, etc. Other examples of introspection comprise determining memory addresses used by various software objects executing within the respective VM, and/or controlling access to a memory location indicated by such addresses. In some embodiments, CSA 40 uses information obtained via introspection to determine whether certain software entities within the respective VM are malicious. When a malicious entity is detected, CSA 40 may take protective action against the respective object, for instance to disable, quarantine, erase, or otherwise incapacitate the respective malicious entity.

In some embodiments, computer security application 40 comprises a notification handler 42 configured to detect the occurrence of certain events relevant to computer security. Exemplary detected events include, among others, calls to certain OS functions and system calls. Other types of detected events may include, opening a file, creating a file, writing to a file, deleting a file, copying a file, creating a process, terminating a process, scheduling a thread for execution, suspending a thread because of a synchronization event (e.g. mutual exclusion), creating a heap, allocating memory from heap, extending the size of an execution stack, changing a memory access permission, performing a swap-in (e.g. disk-to-memory) operation, performing a swap-out (e.g. memory-to-disk) operation, loading an executable module (e.g., shared library—DLL), opening a registry key, renaming a registry key, detecting the attachment of a new hardware device, establishing a new network connection, receiving a network packet, raising the execution privileges of a thread, changing the discretionary access control (DAC) permission associated with a file. Several methods of detecting such events are known in the art. They include hooking certain OS functions, modifying dispatch tables, etc. Such methods configure processor 12 to switch from executing the triggering entity (e.g., a process) to executing a handler routine in response to an occurrence of the respective event. Registering notification handler 42 as the handler routine allows handler 42 to detect various events, and to communicate their occurrence to CSA 40.

In hardware virtualization platforms, a special category of detected events which may be relevant to computer security includes detecting a violation of a memory access permission. Most modern computer systems are configured to operate with virtual memory and to manage memory address translations using dedicated data structures, for instance page tables. Systems configured to support hardware virtualization typically use a second layer of address translations, from a guest-physical memory seen by each exposed VM to the actual physical memory 14 of the host system. The second address translation is typically achieved using hardware-accelerated, dedicated data structures and mechanisms controlled by processor 12, known as second level address translation (SLAT). Popular SLAT implementations include extended page tables (EPT) on Intel® platforms, and rapid virtualization indexing (RVI)/nested page tables (NPT) on AMD® platforms. SLAT typically allows setting memory access permissions for each memory page, such as read/write/execute. Processor 12 may be configured to trigger a processor event when software attempts to access the respective page in a manner that violates the current access permissions. The respective processor event may be handled either within or outside the virtual machine where the triggering entity executes. Registering notification handler 42 as the handler for such processor events enables handler 42 to detect attempts to violate memory access permissions within a virtual machine, and communicate such attempts to CSA 40. Notifications of events occurring within a virtual machine are herein deemed introspection notifications (IN).

FIGS. 2-B-C show two exemplary locations of notification handler 42 according to some embodiments of the present invention. Handler 42 may execute either outside the protected guest VMs, for instance at the level of hypervisor 30 (FIG. 2-B), or within a protected guest VM (FIG. 2-C). Placing handler 42 within guest OS 34 is meant to indicate that handler 42 may execute at a processor privilege level specific to the operating system (e.g., ring 0 or kernel mode).

In response to receiving notification of the occurrence of an event, CSA 40 may proceed to determine whether the respective event is indicative of a computer security threat. In conventional computer security applications, such event analysis is typically performed while execution of the entity that triggered the respective event is suspended. Suspending the execution of the triggering entity may improve security by preventing a potentially malicious entity from operating changes to the host system. However, such suspensions may substantially slow down host system 10, thus affecting user experience. Some embodiments of the present invention rely on the observation that not all operations involved in the analysis of a security event necessitate that the execution of the triggering entity be suspended. Instead, in some embodiments of the present invention, a part of the analysis is performed in a synchronous manner, while another part of the analysis may be performed asynchronously. The term synchronous is used herein to denote a manner of analyzing an event wherein execution of the entity generating the event (herein deemed triggering entity, for simplicity) is suspended while the respective analysis is performed. In contrast to synchronous analysis, asynchronous analysis refers to a manner of analyzing an event, wherein the triggering entity is allowed to continue execution, while the respective event is inserted into an event queue, to be analyzed later on.

In some embodiments, CSA 40 comprises a synchronous analysis module 44 and an asynchronous analysis module 46. Modules 44 and 46 are configured to perform synchronous and asynchronous event analyses, respectively. FIGS. 3-A-B-C show various exemplary positions of modules 44 and 46 according to some embodiments of the present invention.

Synchronous analysis may comprise, for instance, a subset of operations that are critical for assessing the security risk posed by a monitored entity. Some types of events may be malware-indicative in themselves, i.e., the occurrence of such an event may signal that the entity causing the respective event is malicious. In some embodiments, such events may be analyzed synchronously. In another example, when the notified event is the creation of a new process, synchronous analysis may comprise, among others, activating monitoring protocols for the new process, verifying whether the new process is digitally signed, and performing a local malware scan of the new process. A local scan hereby denotes a part of a security analysis that may be carried out exclusively using resources readily available to host system 10, without requiring connecting to remote databases and/or computer systems. A local scan may employ, for instance, a set of malware signatures stored on computer-readable media connected to host system 10. Synchronous analysis module 44 may execute outside the protected guest VM (see FIG. 3-A), or inside the respective guest VM, for instance in kernel mode (as in FIGS. 3-B-C). Considering that synchronous processing suspends the execution of the monitored entity and therefore should be as quick as possible so as to not impact user experience, configurations illustrated in FIGS. 3-B-C (that do not require a costly exit from the monitored VM) may be preferable to the one illustrated in FIG. 3-A. In some preferred embodiments, synchronous analysis module 44 executes in the execution context of notification handler 42.

In contrast to synchronous analysis, the operation of asynchronous analysis module 46 is not tied to the execution of the entity triggering the notified event, in the sense that the triggering entity is allowed to continue execution, while the notified event is added to an event queue, for processing at a later time. Exemplary operations that form part of asynchronous analysis include, among others, determining the integrity of the triggering entity (for instance, using hash matching), performing a remote scan of the triggering entity (e.g., by sending information about the respective entity to a remote cloud server are receiving a maliciousness verdict from the respective server), and determining whether the triggering entity is the recipient of code injected by another entity. Other exemplary asynchronous analyses comprise determinations that require a substantial computational effort, and therefore would lead to an unacceptable delay in execution of the triggering entity, if they were to be performed synchronously. Such determinations may include, for instance, determining certain features of the monitored entity from a position outside the respective guest VM (e.g., from the level of hypervisor 30).

Asynchronous analysis module 46 may execute either outside the protected guest VM (FIGS. 3-A and 3-C), or inside the respective VM (FIG. 3-B). When placed inside a guest VM, module 46 may execute in the context of notification handler 42, as described further below. In the embodiment illustrated in FIG. 3-C, asynchronous analysis module 46 executes in a dedicated security VM 33, distinct from protected guest VM 32.

FIG. 4 shows an exemplary sequence of steps performed to set up computer security protection in some embodiments of the present invention. Steps 102-108 only apply to hardware virtualization platforms. In a step 110, CSA 40 may enable notification handling, for instance by registering notification handler 42 as the handling entity for a set of processor events.

Step 112 may comprise configuring processor 12 to generate a processor event in response to an occurrence of a trigger software event, such as a system call or an attempt by software to access a memory page in a manner that violates current memory access permissions for the respective page. Exemplary processor events handled by notification handler 42 include VM exit events and virtualization exceptions, depending on whether handler 42 executes outside or within the protected guest VM. VM exit events (for instance VMExit on Intel® platforms), suspend execution of code within the respective VM and switch processor 12 to executing code at the level of hypervisor 30. In contrast, virtualization exceptions, such as #VE on Intel® platforms, may switch processor 12 to executing code within the same VM.

Some embodiments of the present invention modify the conventional instruction set architecture (ISA) of the processor to introduce a dedicated instruction for delivering event notifications, as described in detail below. In a preferred embodiment having a processor that is able to process event notification instructions, step 110 may comprise selecting a particular set of event types that should trigger notifications, and configuring processor 12 to deliver event notifications in response to an occurrence of such types of trigger events. The selection of triggers may be done according to various criteria, such as desired security level, for instance. To selectively activate event notifications, CSA 40 may edit a set of fields of an event notification control register of processor 12 (see description further below).

Taking full advantage of the event notification instruction may require that software producers, for instance OS developers, modify existing code by inserting the event notification instruction at various points within the code, e.g., wherever the respective code performs an operation which amounts to a monitored type of trigger event, while ensuring that an indicator of an event type of the respective trigger event is passed as an operand of the notification instruction. A version/build of software that includes notification instructions is herein referred to as a notification-enabled binary. To enable the notification delivery mechanism, a step 116 ensures that such notification-enabled binaries (e.g., OS kernel, libraries, etc.) are loaded.

Figure 5:
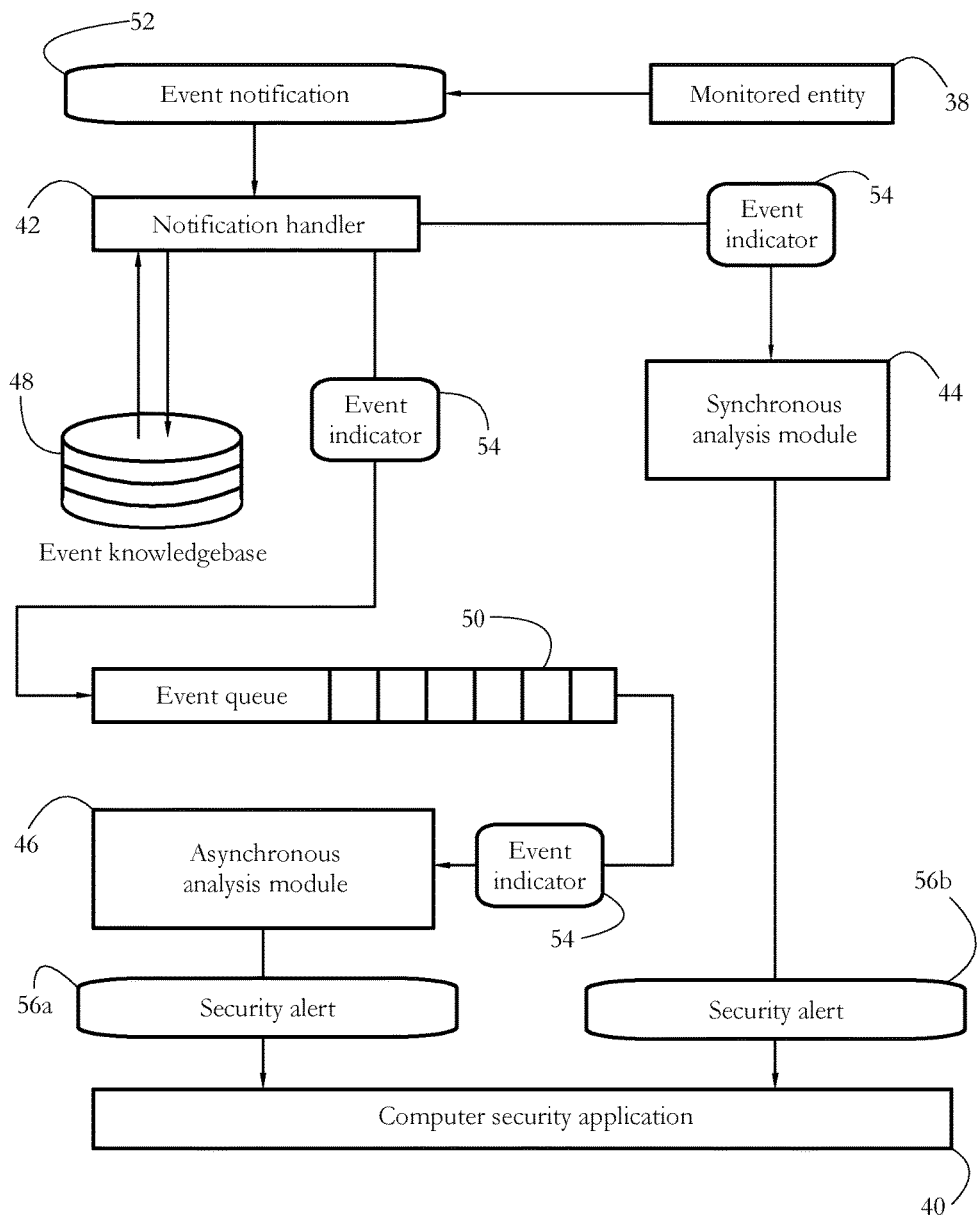
FIG. 5 shows an exemplary operation of the notification handler, synchronous analysis module, and asynchronous analysis module according to some embodiments of the present invention.
Figure 6:
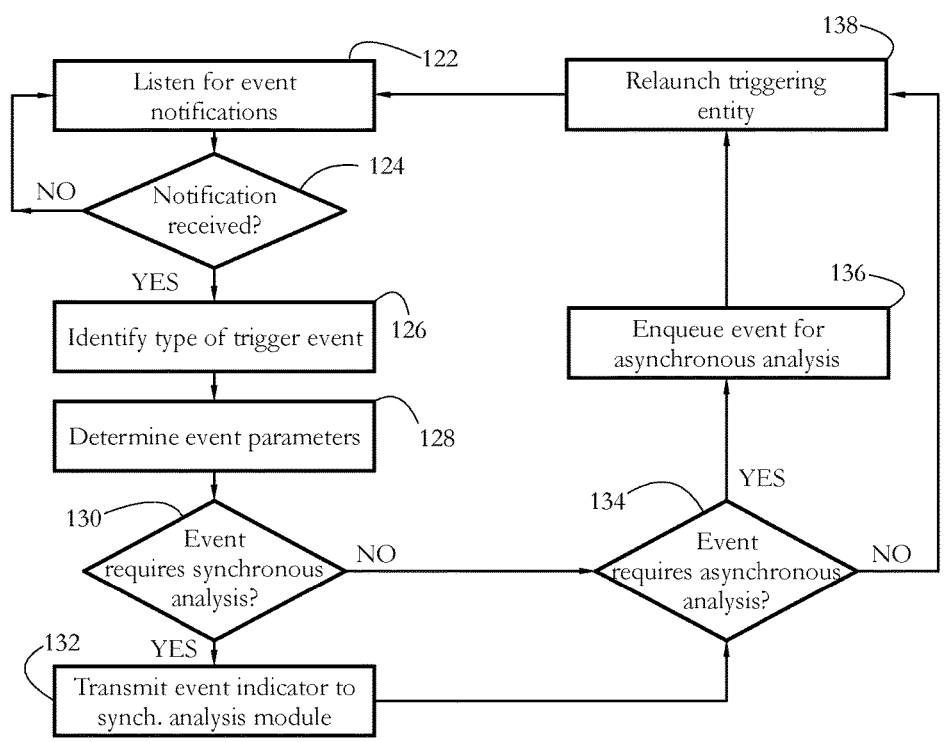
FIG. 6 shows an exemplary sequence of steps carried out by the notification handler according to some embodiments of the present invention.

FIG. 5 shows an exemplary interaction between notification handler 42, synchronous analysis module 44, and asynchronous analysis module 46 according to some embodiments of the present invention. FIG. 6 shows an exemplary sequence of steps performed by notification handler 42. When a monitored entity 38 causes the occurrence of an event within host system 10 and/or within guest VM 32, the event causes an event notification 52 (e.g., a virtualization exception) to be delivered to handler 42. Handler 42 may then determine a type and a set of parameters of the currently notified event (steps 126-128 in FIG. 6). Exemplary event types include, among others, code injection, a particular system call, creation of a disk file, and a HTTP request. Event parameters may be specific to each type of notified event. Some exemplary event parameters include, among others, an identifier of a process or thread (e.g., process ID) causing the notified event, a filename, a path, a memory address, and an operand of a processor instruction.

Some types of events may require synchronous analysis, asynchronous analysis, or both. In some embodiments, an event knowledge base 48 may store a plurality of entries, wherein each entry represents an event type. Each entry may comprise a synchronous flag and/or an asynchronous flag, the value of which indicates whether an occurrence of the respective type of event warrants synchronous and/or asynchronous analysis, respectively. When the currently notified event requires synchronous processing, handler 42 may transmit an event indicator 54 to synchronous analysis module 44. Event indicator 54 may comprise a unique identifier (event ID), and a set of parameters of the respective event. Module 44 may perform a synchronous analysis of the respective event. When the synchronous analysis indicates that the currently notified event is indicative of a computer security threat (e.g., is malware-indicative), synchronous analysis module 44 may transmit a security alert 56*b* to CSA 40.

When the currently notified event requires asynchronous analysis, notification handler 42 may add the respective event to an event queue 50 for later processing by asynchronous analysis module 46. In some embodiments, event queue 50 is a multi-producer, multi-consumer queue, which may be of the first-in-first-out (FIFO) type. In a step 138, handler 42 may instruct processor 12 to resume execution of the triggering entity.

Figure 7:
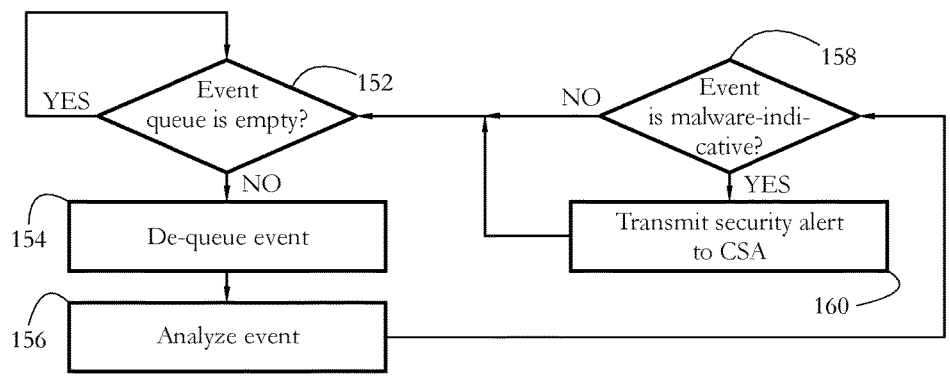
FIG. 7 illustrates an exemplary sequence of steps performed by the asynchronous analysis module according to some embodiments of the present invention.

Computer security application 40 may manage a thread pool for asynchronous event processing. Threads of the pool may execute outside of the monitored VM (in configurations such as FIG. 3-A or 3-C) or within the monitored VM, for instance in kernel mode (in configuration such as FIG. 3-B). Whenever a thread of the pool becomes available, CSA 40 may launch an instance of asynchronous analysis module 46. FIG. 7 shows an exemplary sequence of steps carried out by such an instance of module 46. When event queue 50 is non-empty, module 46 may remove an event from queue 50 and perform an asynchronous analysis of the respective event. When the event indicates a computer security threat according to a result of the asynchronous analysis, module 46 may transmit a security alert 56*a* to CSA 40.

In response to receiving security alert(s) 56*a* and/or 56*b*, computer security application 40 may take protective action against monitored entity 38. Such protective action may include, among others, suspending execution of, or otherwise incapacitating entity 38, and rolling back a set of changes made to host system 10 as a result of execution of monitored entity 38. In some embodiments, CSA maintains a set of malware-indicative scores associated with each monitored entity. In response to receiving a security alert, the respective score(s) may be incremented by an amount that may be event-specific. CSA may compare the score(s) with a threshold and take protective action only when, for instance, a score exceeds a predetermined threshold.

Depending on the execution context of various software modules, the operation of components 42-44-46 may require complex signaling/messaging, sometimes across virtual machine boundaries. Such signaling may be carried out using any technique known in the art of hardware virtualization. A further problem is making event queue 50 accessible to instances of notification handler 42 (for adding events to the queue) and to instances of asynchronous analysis module 46 (for de-queuing events). In some embodiments, event queue 50 is stored in a section of memory shared between handler 42 and module 46.

Figure 8:
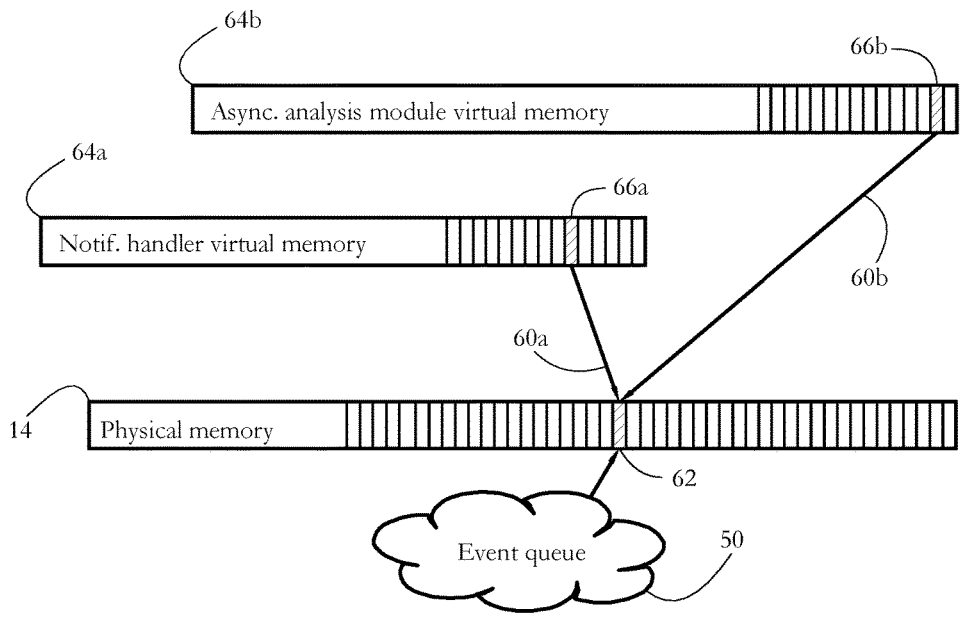
FIG. 8 illustrates an exemplary memory mapping allowing the notification handler and asynchronous analysis module concurrent access to an event queue, according to some embodiments of the present invention.

A shared access to event queue 50 may be ensured by hypervisor 30 and/or CSA 40, either actively or passively. One such memory sharing setup is illustrated in FIG. 8. In the illustrated example, a part of event queue 50 is stored within a page 62 of physical memory unit 14. In some embodiments, hypervisor 30 and/or CSA 40 may set up a plurality of distinct page tables enabling access to physical memory page 62. One exemplary page table may enable an address translation 60*a* mapping a virtual page 66*a* of a memory context of an instance of notification handler 42 to physical page 62. Another page table may enable an address translation 60*b* mapping a virtual page 66*b* in a memory context of an instance of asynchronous analysis module 46 to the same page 62. In such a manner, handler 42 and module 46 share access to event queue 50. Each page table may further specify a type of access to page 62. For instance, notification handler 42 may be allowed to write to page 62, while module 46 may only be allowed to read from page 62.

In some embodiments (active view switching), hypervisor 30 is notified by event handler 42, for instance via a VM exit event, that an event has been added to event queue 50. Hypervisor 30 may then explicitly switch processor 12 from using one page table to using another, for instance to give module 46 access to event queue 50. In other embodiments (passive view switching), handler 42 and/or analysis module 46 may switch between one memory view and another by issuing a specific processor instruction (e.g., VMFUNC on Intel® platforms), without having to exit the respective VM. Such SLAT-switching mechanisms are well documented in the art of virtualization.

In a preferred embodiment, asynchronous analysis module 46 executes within the context of notification handler 42. Such a configuration may be preferable for security reasons, since in such a configuration handler 42 may be the only entity having access to event queue 50. In one such example, CSA 40 launches an instance of analysis module 46 using a kernel thread of the monitored VM for execution. In response to the launch, module 46 may issue a particular type of notification instruction (identified, for instance, by a particular, predetermined numerical ID). The notification will thus invoke an instance of notification handler 42, which will execute in the context of the same execution thread as the respective instance of module 46. In response to receiving the particular type of notification, handler 42 may issue a VMFUNC instruction to switch from a first memory view (SLAT page table) to a second memory view. In some embodiments, the first memory view does not give the current thread access to queue 50 (this may be the default memory view of OS 34). The second memory view may give the current thread read and write access to queue 50, to enable handler 42 to add events to queue 50 and asynchronous analysis module 46 to de-queue events for analysis. In some embodiments, the first and second memory views further comprise settings that protect handler 42 and/or module 46 against potential malicious exploitation. In one such example, the first memory view may allow the current thread execution rights to the OS kernel functions, while the second memory view may allow only a restricted subset of OS functions to be executable. In such a configuration, even if an attacker gains access to the thread executing handler 42 and/or module 46, the attacker may not be able to execute substantial malicious code while the current thread uses the second memory view.

FIGS. 9-15 illustrate a preferred exemplary embodiment, wherein event notifications are delivered via a dedicated processor instruction. Instances of the event notification instruction may be inserted throughout software, wherever such a notification might be useful for computer security purposes. To achieve such functionality, some embodiments change the conventional hardware of processor 12 in a manner described below.

In some embodiments, the event notification instruction may include an operator field (e.g., mnemonic, opcode) indicating an operation, and an operand field representing one or more operands. Some examples of event notification instruction are given below:

NOTIFYINTRO  [1],

NOTIFYINTRO trigger_ID  [2], and

NOTIFYINTRO trigger_ID, trigger_PTR  [3], wherein NOTIFYINTRO represents the operator and trigger_ID, trigger_PTR represent operands. The illustrated mnemonic, syntax, choice, and order of operands are meant as examples. A skilled artisan will appreciate that such details may be changed in many ways without affecting the scope of the present invention.

In some embodiments, an operand of the event notification instruction (e.g., trigger_ID in examples [2]-[3]) is indicative of a type or category of events occurring within the respective host system or guest VM. The event type may be conveyed by a numerical ID/label uniquely associated to the respective type or category of trigger events. In one such example, NOTIFYINTRO 0x01a7 represents a notification about the occurrence of an event of type 0x01a7 (e.g., opening a disk file). The numeric ID/label associated to each trigger event type may be decided, for instance, by the OS manufacturer.

In some embodiments, another operand of the event notification instruction (e.g., trigger_PTR in example [3]) indicates a parameter associated with the current trigger event, such as a quantity being changed as a result of the occurrence of the respective trigger event. One such exemplary parameter is a pointer to an object or data structure modified by the occurrence of the trigger event. In one example wherein the trigger event comprises the OS switching from executing a first process to executing a second process, trigger_PTR may indicate a pointer to a data structure used by the OS to manage execution of the second process. In a Windows® environment, such a data structure may be the KPROCESS data structure associated with the second process. Passing such operands on to CSA 40 may facilitate introspection and/or event analysis, by allowing CSA 40 to avoid calculating the respective values. Such calculations may be relatively expensive, requiring, for instance, memory address translations across multiple contexts.

Examples [2] and [3] illustrate event notification instructions having explicit operands. In some embodiments, operands of the event notification instruction may be implicit (e.g., as in [1]). In one such example, an operand may be stored in a pre-determined processor register of the respective guest (e.g., the EAX register on x86 platforms). In such embodiments, an exemplary sequence of instructions may be:

```
. . .
MOV EAX, 0x01a7
NOTIFYINTRO
. . . ,
``` wherein the MOV instruction puts the label associated with the type of event currently being notified into the EAX register of the respective guest VM, where it can be accessed by notification handler 42.

In some embodiments, the notification instruction may be encoded in such a way, that it is ignored by certain processor models (e.g., legacy models). Such processors may thus interpret the notification instruction as a no-operation (NOP) instruction and skip over the respective notification instruction. Several methods are known in the art to achieve such encoding. One example uses a multiple-byte encoding of the NOP instruction (e.g., "NOP/0 Ev" on Intel® platforms). Another common method involves prefixing an existing instruction (such prefixes may not be interpreted or may be ignored by legacy processors). In yet another embodiment, the semantics of an existing instruction may be changed to achieve the new functionality. In one such example, an instruction which does not perform any useful operation on legacy processors, for instance, "MOV RDI, RDI" may function as an event notification instruction on a new generation of processors, especially if its encoding includes a segment prefix (e.g., ES).

Figure 9:
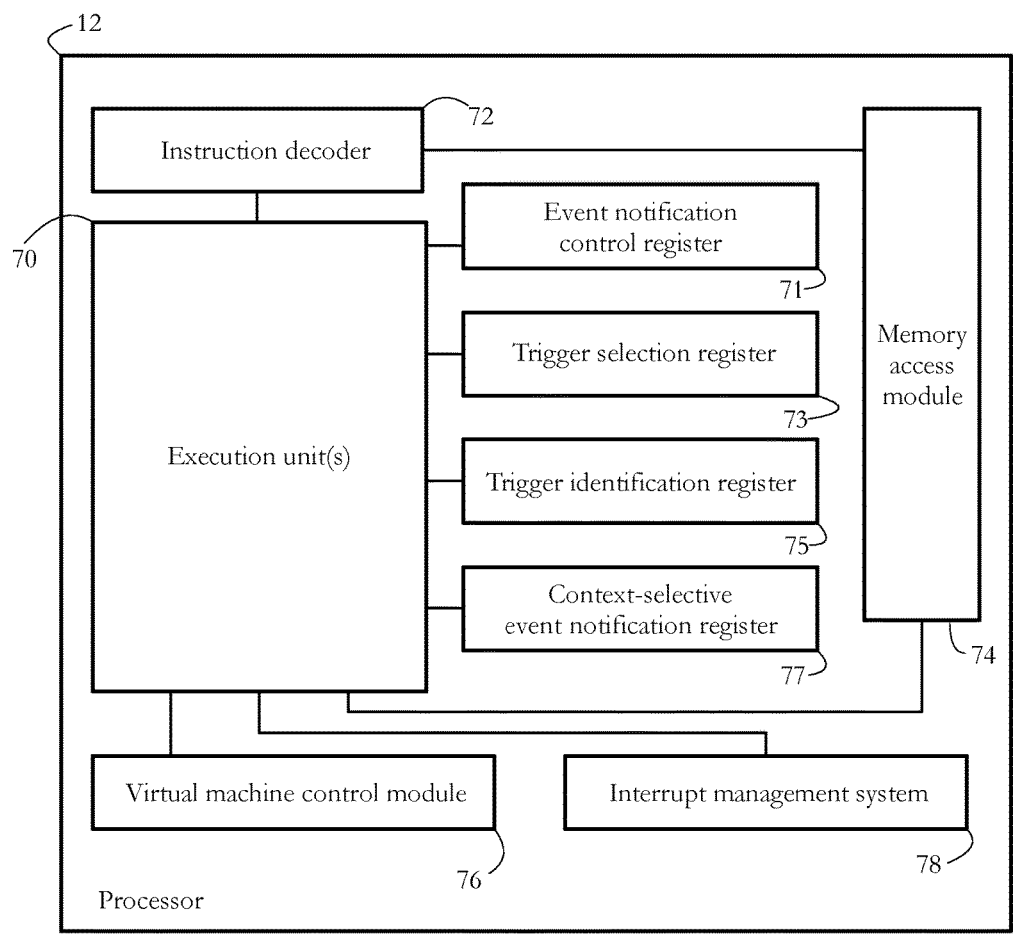
FIG. 9 shows exemplary components of a processor according to some embodiments of the present invention.

FIG. 9 shows exemplary hardware components of processor 12 according to some embodiments of the present invention. The illustrated components are meant as generic devices performing the described functionality; structural details may vary substantially among implementations. For instance, each illustrated component may comprise multiple interconnected subsystems, not necessarily in physical proximity to each other. The illustrated components are not exhaustive; processor 12 may include many other components (e.g., scheduler, register file, commit module, etc.), which were omitted from FIG. 9 for reasons of clarity.

Modern processors are typically configured for multi-threading. In such configurations, physical processor 12 may operate a plurality of cores, each core further comprising multiple logical processors, wherein each logical processor may process an execution thread independently of, and concurrently with, other logical processors. Multiple logical processors may share some hardware resources, for instance, a common MMU. For simplicity, FIG. 9 illustrates a single logical processor. A skilled artisan will appreciate that the description may be extended to cover each logical processor of a multithreaded configuration.

Processor 12 may include logic/circuitry configured to carry out various stages of a processor pipeline. For instance, an instruction decoder 72 may perform instruction decoding operations, including translating each processor instruction into a set of micro-opcodes. A set of execution units 70 connected to decoder 72 may perform the execution stage of the pipeline. Exemplary execution units 70 include, among others, an arithmetic logic unit (ALU) and a floating-point unit (FPU). A memory access module 74 connected to decoder 72 and execution unit(s) 70 includes logic configured to interact with memory 14, e.g., to fetch instructions from memory, to read data from memory, and to write the result of execution of processor instructions to memory.

In host systems configured to support hardware virtualization, processor 12 may further include a virtual machine control unit 76 configured to manage virtual machine state data. In some embodiments, a virtual machine state object (VMSO) comprises a data structure used internally by processor 12 to represent the current state of each virtualized logical processor exposed on host system 10. Exemplary VMSOs include the virtual machine control structure (VMCS) on Intel® platforms, and the virtual machine control block (VMCB) on AMD® platforms. VMSOs are typically set up by hypervisor 30. In some embodiments, processor 12 associates a region in memory with each VMSO, so that software may reference a specific VMSO using a memory address or pointer (e.g., the VMCS pointer on Intel® platforms).

Each VMSO may comprise, among others, a guest state area and a host state area, the guest state area holding the current CPU state (e.g., processor register values) of the respective guest VM, and the host state area storing the current CPU state corresponding to the execution of hypervisor 30. In some embodiments, each VMSO further comprises an indicator of a guest context. For instance, the guest state area of the VMSO may include an identifier of a process currently under execution by the respective virtualized processor/VM. One example of such an identifier is stored within the CR3 register of the respective virtual processor, and indicates an address of a page table configured address translations corresponding to the respective process.

In some embodiments, processor 12 may store a part of a VMSO within dedicated internal registers/caches, while other parts of the respective VMSO may reside in memory. At any given time, at most one VMSO (herein termed the current VMSO) may be loaded onto the processor, identifying the virtual processor/VM currently having control of processor 12. In a multithreading embodiment, a distinct VMSO may be loaded onto each distinct logical processor.

When processor 12 switches from executing a guest VM to executing hypervisor 30 (e.g., upon a VM exit), processor 12 may save the state of the respective VM to the guest state area of the current VMSO. When processor 12 switches from executing a first virtualized processor (first VM) to executing a second VM, the VMSO associated to the first VM is unloaded, and the VMSO associated to the second VM is loaded onto the processor, the second VMSO becoming the current VMSO. In some embodiments, such loading/unloading of VMSO data to/from processor 12 is performed by virtual machine control unit 76, e.g., as instructed by hypervisor 30. Unit 76 may further carry out the retrieval and/or saving of VMSO data from/to memory 14.

Processor 12 may further include an interrupt management system 78, generically representing logic configured to manage hardware interrupts and processor exceptions. System 78 may contain multiple subsystems distributed over several processor modules. For instance, system 78 may include a local advanced programmable interrupt controller (LAPIC). System 78 may generate and/or process a part of an event notification, such as a VM exit or virtualization exception, among others.

The illustrated processor further comprises a set of registers, configured to store control parameters regulating event notifications, as detailed below. In hardware virtualization configurations, such parameters may regulate event notifications for the currently executing virtual processor (identified, e.g., by the currently loaded VMSO), or for a particular VM/virtual processor exposed on host system 10 (the targeted virtual processor may be specified, for instance, using a pointer to the respective VMSO, the pointer stored in one of the register fields). The illustrated registers may be dedicated control registers of processor 12, or a bank of model-specific registers (MSRs).

In some embodiments, parameters regulating event notifications are stored in a set of dedicated fields of a VMSO of the respective virtual machine, where they can be accessed for reading and/or writing by software executing, for instance, at the level of hypervisor 30. In such cases, VM control unit 76 may copy the respective parameter values into the illustrated registers (or into other internal processor registers) when loading the respective VMSO onto the processor, or may retrieve such values from memory on demand.

Figure 10:
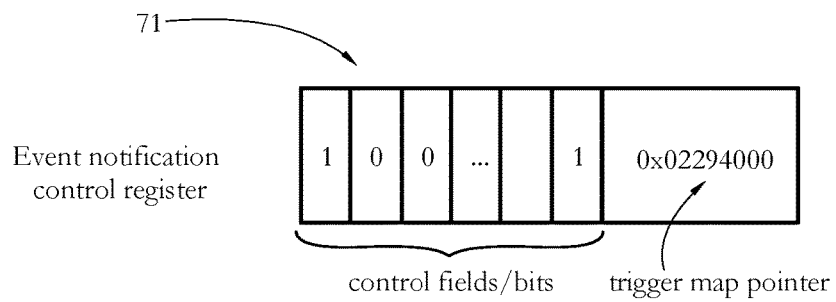
FIG. 10 shows an exemplary event notification control register of the processor according to some embodiments of the present invention.

FIG. 10 shows a set of exemplary fields of an event notification control register (ENCR) 71, according to some embodiments of the present invention. In all drawings of processor registers shown herein, the provided illustration is meant as a generic example; the order and content of individual fields may vary from one implementation to another. Also, not all illustrated fields must be part of the same physical register; instead, some fields may reside in various locations within processor 12. In some embodiments, one of the control fields of ENCR 71, herein named notification activation field, indicates whether event notifications are currently active. An exemplary notification activation field comprises a bit, which may take the values 1 (for ON) or 0 (for OFF). Some embodiments use a specific processor instruction to instruct processor 12 to deliver an event notification. In such embodiments, the current value(s) of the notification activation field, among others, are used by execution unit(s) 70 to determine whether or not to deliver the notification when encountering the respective processor instruction. When notifications are currently not active, as indicated by the current value(s) of the notification activation field, some embodiments may interpret the notification instruction as a no-operation (NOP) instruction.

In some embodiments, another control field (e.g., a bit) of ENCR 71, herein named trigger filtering field, indicates whether trigger filtering is currently enabled. When the trigger filtering field is ON (e.g., 1), some embodiments of processor 12 may deliver event notification only for a selected subset of trigger events, as shown further below. Another control field (e.g., a bit) of ENCR 71, herein termed exit control field, may indicate a type of exit event generated by processor 12 in case of a notification. In some embodiments, processor 12 may be configured to generate a VM exit (appropriate when the notification handler executes outside the respective guest VM, e.g., FIG. 2-B) or a virtualization exception (appropriate when the notification handler executes within the respective VM, e.g., FIGS. 2-C). In some embodiments, event notifications may be delivered to the kernel of the operating system (as opposed to handler 42). Such a notification may be delivered, for instance, as an exception; this option may be activated by setting a corresponding value of the exit control register.

Figure 11:
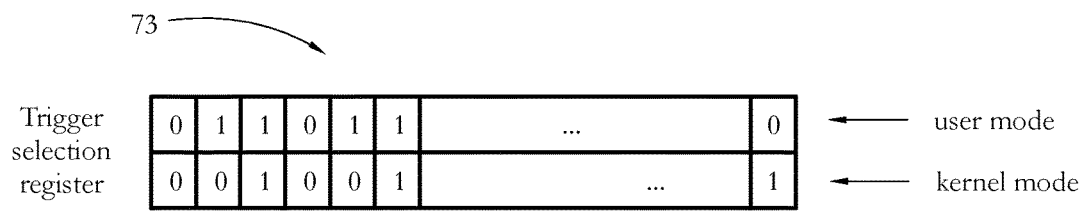
FIG. 11 shows an exemplary trigger selection register of the processor according to some embodiments of the present invention.
Figure 12:
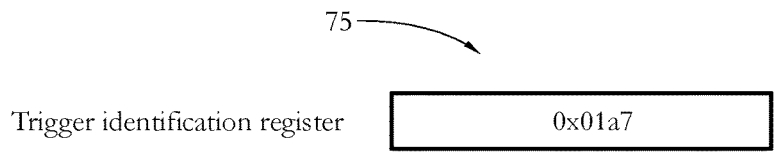
FIG. 12 shows an exemplary trigger identification register of the processor according to some embodiments of the present invention.

In some embodiments, processor 12 further comprises a trigger selection register 73, as illustrated in FIG. 11. Register 73 comprises a plurality of fields (e.g., a bitmap with N entries), wherein each field corresponds to a distinct type of trigger event. In one such example, one field may represent creating a new process, another field may represent accessing an OS registry, yet another field may represent opening a disk file for writing, etc. Such fields may be set independently of each other. In an exemplary embodiment, a chunk of register 73 (e.g., the first 1024 entries) may be reserved for trigger events of the system call type. Setting a field of trigger selection register 73 to ON (e.g., 1) may instruct the processor to generate an event notification indicating the occurrence of the type of trigger event associated to the respective field. In contrast, setting the respective field to OFF (e.g., 0) may instruct processor 12 to ignore the occurrence of the respective trigger event type (i.e., not to deliver notifications of such events).

For each trigger event type, some embodiments further distinguish between several protection domains allowed by processor 12 (e.g., processor privilege levels, rings). In the example of FIG. 11, trigger selection register 73 comprises distinct bitmaps for user mode (ring 3) and kernel mode (ring 0). The values corresponding to the various protection domains may be set independently of each other. In such embodiments, the occurrence of a selected type of trigger event in user mode may generate a notification, whereas the occurrence of the same type of trigger event in kernel mode may be ignored, for instance. The trigger selectivity enabled by register 73 allows for a useful customization of the notification mechanism. Ring-specific trigger customization may further refine the granularity of event notifications. Such features may be fully exploited by computer security software to optimize threat detection, as shown further below.

Some embodiments store the trigger selection bitmap(s) in memory, as opposed to in a dedicated processor register. In such embodiments, ENCR 71 may further include a field configured to store a memory address of the respective data structure (such an address is herein termed trigger map pointer). Software such as CSA 40 or hypervisor 30 may thus selectively (de)activate individual trigger events by writing to the section of memory indicated by the trigger map pointer. In some embodiments, the trigger selection bitmap(s) occupy a dedicated field of a VMSO of the currently executing guest VM. In such cases, the trigger map pointer may coincide with a pointer to the respective VMSO (e.g. VMCS pointer on Intel® platforms).

In some embodiments, processor 12 further includes a trigger identification register 75 (FIG. 12) configured to store an identifying indicator of a current type of trigger event (e.g., a trigger ID). Contents of register 75 may be interpreted by processor 12, for instance, as implicit arguments of a NOTIFYINTRO instruction. Exemplary embodiments of trigger identification register 75 include the EAX register (on x86 platforms), and a dedicated MSR, among others.

Guest software may instruct processor 12 to place a specific value into register 75 prior to issuing a notification instruction, the value indicating a selected trigger event type. An exemplary sequence of instructions is shown below:

```
...
MOV reg75, 0x01a7
NOTIFYINTRO
...,
``` wherein reg75 denotes the name of trigger identification register 75 (e.g. EAX), and 0x01a7 indicates the trigger ID.

When the trigger selection bitmap (e.g., register 75) is configured to store N distinct entries (e.g. N=8192), ENCR 71 may further include a control field/bit herein termed overrun control field. The content of the overrun control field may indicate whether processor 12 should generate a particular event (e.g., exception) when the current value of trigger identification register 75 does not allow a positive identification of the current trigger event. Such a situation may arise, for instance, when register 75 stores a value greater than N, or when the current value of register 75 is otherwise outside the range of values assigned to trigger events. When the overrun control field is ON (e.g., 1), processor 12 may deliver the notification despite failing to identify the trigger event. Alternatively, processor 12 may generate another exception to alert the OS and/or hypervisor 30 about the error. Such a configuration may prevent a malicious exploitation of the event notification mechanism. In yet another embodiment, when the current value of register 75 is out of range, processor 12 may interpret the current instruction notification as a no-operation (NOP) instruction.

Modern operating systems typically manage a plurality of virtual memory spaces, each such virtual memory space comprising an abstraction of the actual physical memory 14, e.g., a contiguous space of virtual addresses. Each such memory space may be associated to a software object (e.g., a user process, a component of the OS, etc.). To correctly map virtual addresses in the object's memory space to physical memory addresses, the OS may set up a translation data structure (e.g., page table), and save the respective data structure to memory. A pointer to the respective data structure typically resides in a dedicated processor register (e.g., the CR3 register on x86 platforms), and uniquely identifies the currently executing guest process. The memory space of a software object and its associated page table form what is commonly known in the art as the context of the respective software object.

Figure 13:
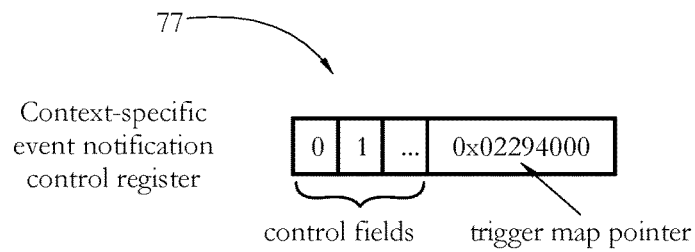
FIG. 13 shows an exemplary context-specific event notification register of the processor according to some embodiments of the present invention.

Some embodiments of the present invention enable context-specific event notifications, i.e., notification control parameters may vary independently between one context (e.g., guest process) and another. In such embodiments, processor 12 may comprise a context-specific ENCR 77, as illustrated in FIG. 13. The structure of context-specific ENCR 77 may be similar to that of global ENCR 71 described above. Register 77 may replace register 71, or may be provided alongside register 71. Control parameters stored in register 71 are herein called "global" parameters, to distinguish them from context-specific control parameters stored in register 77. In an embodiment wherein context-specific ENCR 77 coexists with "global" ENCR 71, event notifications may be controlled by parameter values set in ENCR 71 (as a default), unless context-specific parameter values are set in ENCR 77. In an alternative embodiment, a control field/bit of context-specific ENCR 77 indicates whether context-specific notifications are enabled or not. An ON value instructs processor 12 to use context-specific control values stored in ENCR 77 instead of "global" values stored in ENCR 71.

Context-specific ENCR 77 may include an address field configured to store a pointer to a memory-located trigger selection bitmap set up for the respective context (e.g., trigger map pointer in FIG. 10). The trigger selection bitmap may indicate which types of trigger events may generate notifications, when occurring during execution within the respective context—see above, in relation to FIG. 11. In some embodiments, the management of the trigger map pointer is similar to the management of page tables. The operating system typically creates a new context by allocating memory for the respective context's page table, and associating a pointer to the respective page table (e.g., page directory base register—PDBR pointer on Intel® platforms) with a data structure used by the OS to manage execution of the respective process. For instance, in Windows®, such a data structure may be the KPROCESS structure. When the OS switches contexts from a first process to a second process, a value of the PDBR pointer of the second process is read from the KPROCESS structure associated to the second process, and moved into the CR3 register. In some embodiments, as part of creating a new context, the OS may further allocate memory for a trigger selection bitmap to be used in the respective context, and may save the address of the trigger selection bitmap (e.g., a trigger map pointer) to the KPROCESS data structure associated to the respective process or to another context-specific data structure. Upon switching from a first context to a second context, the OS may retrieve the trigger map pointer associated to the second context from the respective context-specific data structure, and move it into context-specific ENCR 77.

In some embodiments, context-specific ENCR 77 is configured as an extension to the processor register indicating the current context (e.g., an extension of the CR3 register on x86 platforms). Register 77 may also be a register separate from CR3, e.g., a CR5 register or a dedicated MSR. However, in some embodiments, register 77 is operationally connected to CR3 in that an update of CR3 is atomically accompanied by an update of register 77, i.e., no interrupt can occur between updating CR3 and updating register 77. Such atomicity ensures consistency of context switching in a multithreaded environment. Some embodiments achieve a multi-register atomic update by using a dedicated processor instruction issued by the OS of the respective guest VM. One exemplary sequence of instructions is given below (the mnemonic, count, and order of operands may vary):

```
...
MOV reg1, p2.PDBR
MOV reg2, p2.TMP
MOVDUALCR reg1  reg2
...,
``` wherein p2.PDBR denotes the pointer to the PDBR of the second process, p2.TMP denotes the trigger map pointer associated to the second process, and wherein reg1 and reg2 denote some registers of processor 12, directly accessible to software (e.g., RCX and RDX on Intel® platforms). The illustrated instruction MOVDUALCR atomically moves the value of reg1 into CR3 and the value of reg2 into context-specific ENCR 77 (e.g., CR5). The illustrated version of the instruction has CR3 and ENCR 77 as implicit operands; in other embodiments the registers may be specified explicitly. Another embodiment may have reg1 and reg2 as implicit operands.

In an alternative embodiment, the atomic update of CR3 and context-specific ENCR 77 may be achieved without a dedicated processor instruction. In one such example, processor 12 is configured to generate a VM exit event upon detecting an attempt to update the value of CR3. Such an update may indicate that the OS executing within the respective VM may request a context switch. The respective VM exit event may be trapped by a component of hypervisor 30, which may emulate the respective CR3 update and in response, also update the value of context-specific ENCR 77, before resuming execution of the respective VM.

Figure 14:
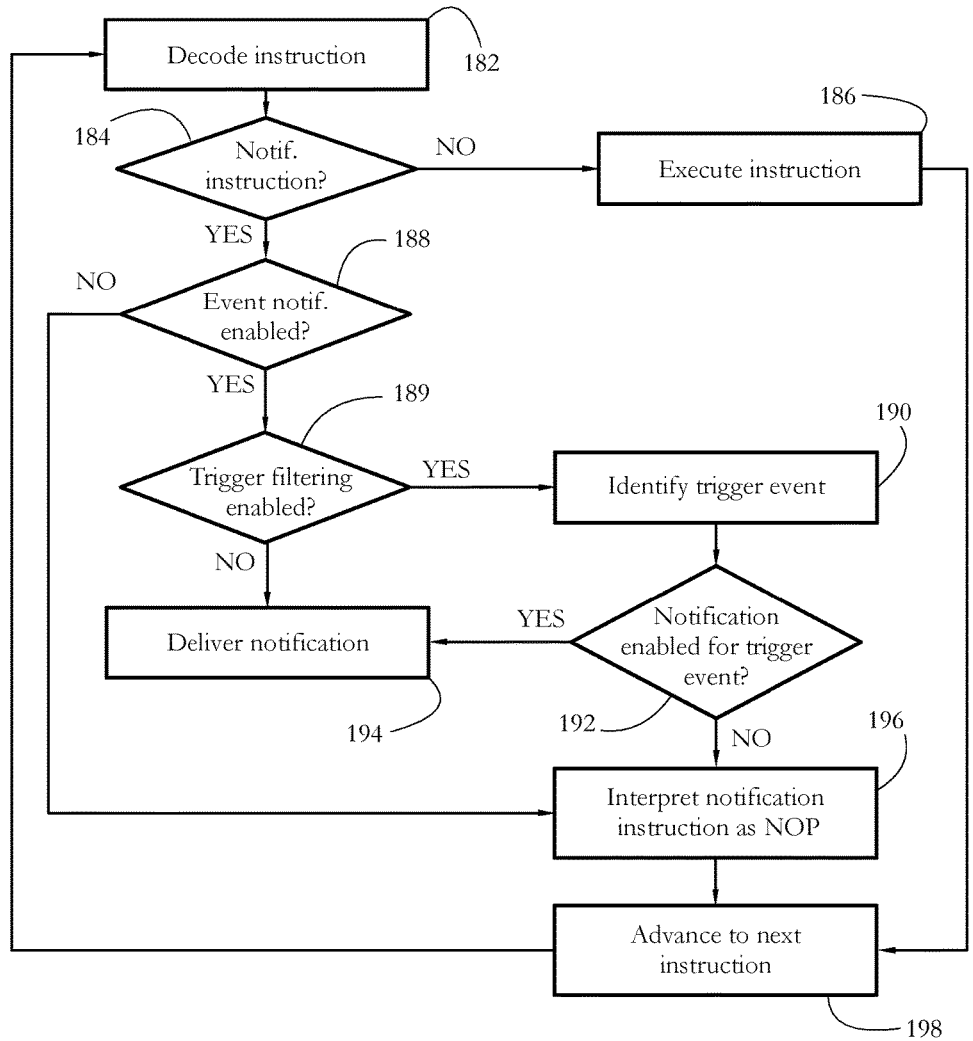
FIG. 14 shows an exemplary sequence of steps performed by a hardware processor of the host system to deliver event notifications according to some embodiments of the present invention.

FIG. 14 shows an exemplary sequence of steps performed by processor 12 in the course of executing an instruction stream (e.g., a process), according to some embodiments of the present invention. In response to decoding an instruction, a step 184 determines whether the current instruction is an event notification instruction (e.g., NOTIFYINTRO described above). When no, in a step 186, processor 12 may execute the current instruction and advance to the next processor instruction (step 198). When the current instruction is an event notification instruction, a step 188 determines whether event notifications are currently enabled, for instance, according to a current value of the notification activation field of ENCR 31 (see above, in relation to FIG. 10). When event notifications are currently disabled, processor 12 may interpret the current instruction as a no-operation (NOP) and advance to the next instruction.

When event notifications are enabled, a step 189 determines whether trigger filtering is currently enabled, for instance, according to a current value of the trigger filtering field of ENCR 31. When no, a step 194 delivers the respective notification to notification handler 42. In some embodiments, delivering the event notification comprises suspending the execution of the current thread/process, and switching to executing handler 42.

When trigger filtering is enabled, in a step 190, processor 12 may identify the reason (type of trigger event) for the current notification, according to an operand of the current instruction. In some embodiments, the operand is implicit and is retrieved from trigger identification register 75 (e.g., the EAX register on x86 platforms). Once the trigger event type is identified, a step 192 determines whether event notifications are currently enabled for the respective type of trigger event. Such determinations may include looking up a current value of a field of trigger selection register 73, the field corresponding to the respective type of trigger event (see e.g. FIG. 11 and associated description). In some embodiments, step 192 may further include determining whether notifications are enabled for the current trigger event further according to the protection domain that processor 12 is currently executing in (e.g., some types of trigger events may generate event notifications only in user mode or kernel mode). When event notifications are enabled for the respective trigger event and protection ring, processor 12 may proceed to step 194 (deliver the event notification). When no, processor 12 may advance to the next instruction without generating a notification.

Figure 15:
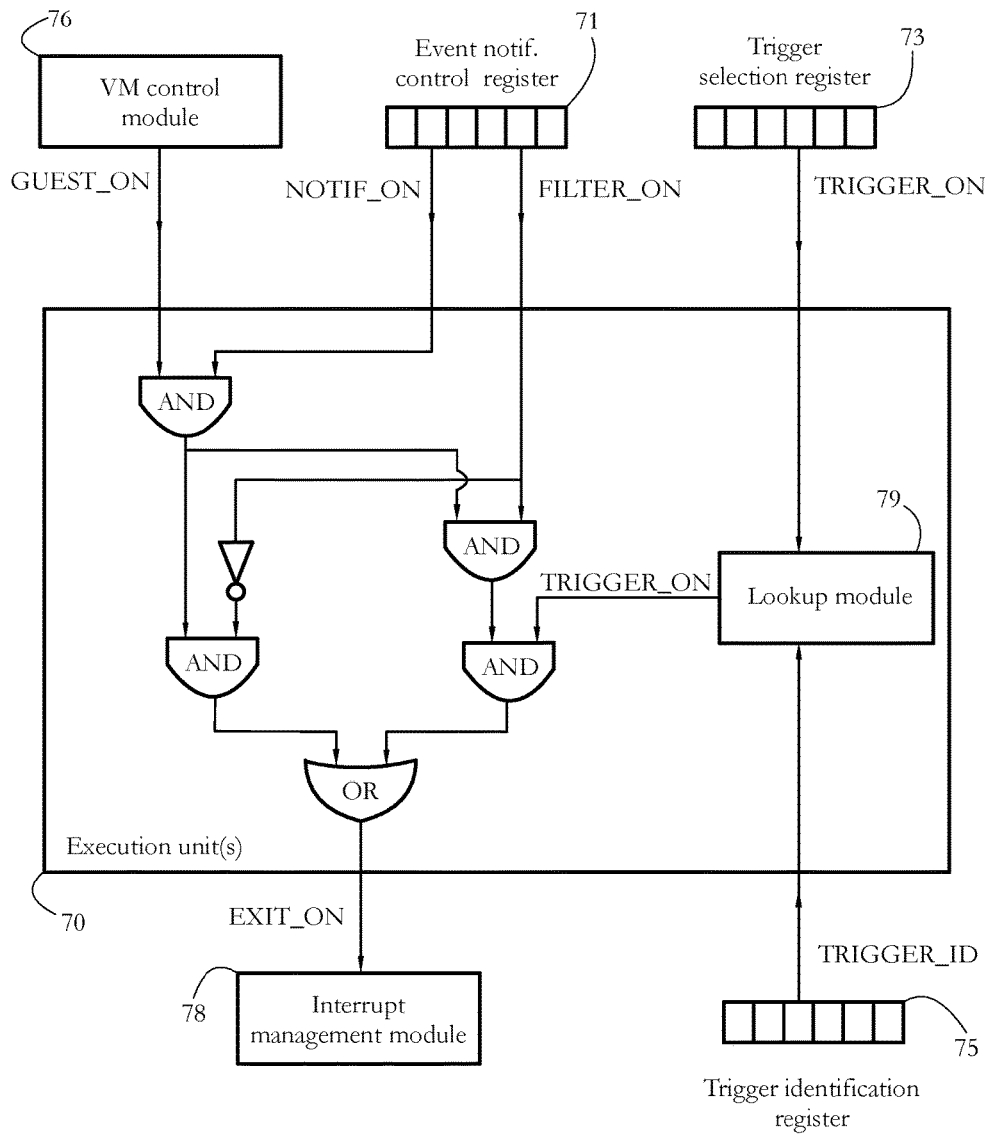
FIG. 15 shows an exemplary hardware configuration of an execution unit of the processor according to some embodiments of the present invention.

FIG. 15 shows an exemplary hardware configuration of execution unit 30 having the functionality described above in relation to FIG. 14. Various components of execution unit 30 that do not directly contribute to the described functionality have been left out for reasons of clarity. The logic illustrated in FIG. 15 receives an input denoted GUEST_ON from VM control module 76; in a processor that does not support hardware virtualization, the GUEST_ON signal may be absent. GUEST_ON may be high (e.g., 1) when the current instruction executes within a guest VM. In some embodiments, the GUEST_ON signal is low when processor 12 is not executing in hardware virtualization mode (e.g., VMX not enabled on Intel® platforms), or when processor 12 currently executes in root mode (e.g., VMXroot on Intel® platforms). Execution unit 70 may further read a pair of values/signals NOTIF_ON and FILTER_ON from ENCR 71 (or from context-specific ENCR 77 when operating in context-specific notification configurations). NOTIF_ON may be high (e.g., 1) when the notification activation field of ENCR 71 is ON indicating that event notifications are currently enabled, and low (e.g., 0) otherwise. FILTER_ON may be high/1 when the trigger filtering field of ENCR 71 is ON indicating that trigger filtering in currently enabled, and low/0 otherwise.

Execution unit(s) 70 may further receive a value TRIGGER_ID from trigger identification register 75, the value uniquely identifying a type of trigger event that is the object of the current event notification. A lookup module 79 of unit 70 may perform a lookup operation to retrieve a value TRIGGER_ON indicating whether event notifications are currently enabled/active for the type of event indicated by TRIGGER_ID. An exemplary lookup operation may comprise retrieving the current value of a field of trigger selection register 75, the value located at a position indicated by TRIGGER_ID. In an embodiment wherein the trigger selection bitmap resides in memory, looking up TRIGGER_ON may include accessing memory at the location indicated by the trigger map pointer, plus an offset indicated by TRIGGER_ID. The logic illustrated in FIG. 15 produces a high output EXIT_ON only when the current instruction is a guest instruction and notifications are enabled. Further, EXIT_ON is high either when trigger filtering is off, or when trigger filtering is on and notifications are enabled for the respective trigger event.

The exemplary systems and methods describe above enable an efficient event notification mechanism, wherein a computer security program is notified of security-relevant events occurring during execution of software on the host system. In response to receiving such event notifications, the computer security program may analyze the respective events to determine whether they are indicative of a security threat. When a currently executing entity (e.g., guest process) triggers an event, conventional computer security systems and methods typically suspend execution of the triggering entity while the respective event is analyzed. Such suspensions may negatively impact user experience. The penalty incurred by suspending the triggering entity is particularly severe in hardware virtualization platforms, where analyzing the event typically comprises exiting the virtual machine that executes the triggering entity. When the computer security program executes outside the monitored virtual machine, the computer security program has access to relatively little information about processes executing within the respective VM. Therefore, substantial amounts of computation may go into bridging this semantic gap.

In contrast to such conventional systems and methods, in some embodiments of the present invention, certain types of events are analyzed asynchronously, in the sense that the triggering entity is allowed to continue execution while the respective event is added to a queue for later processing. Such asynchronous analysis may substantially improve user experience, while preserving security.

A further improvement brought by some embodiments of the present invention comprises the introduction of a dedicated processor instruction to convey event notifications. Detecting the occurrence of security-relevant events during software execution has been a long standing preoccupation of the computer security community. In conventional systems, such events are intercepted via a category of methods generically known as hooking, or by filtering capabilities built into the OS (e.g. file system minifilters and WFP network filters in Windows®). Hooking may comprise modifying an existing OS function by adding a piece of code, which redirects execution of the respective function to the security software. Thus, security software is notified that an attempt has been made to execute the respective function. Such hooking may create performance and stability problems, and may be de-activated or otherwise rendered ineffective by malicious software.

Another conventional event interception method comprises identifying a section of memory where a particular OS function is stored, and changing memory access permissions to the respective memory section to generate an access violation when an attempt is made to access the respective memory section. The violation is typically forwarded for handling to the security software. One problem with such methods is that memory access permissions are typically set with a hardware-enforced granularity (e.g., one memory page of 4 kB). When the targeted function resides in the same page as other software objects, changing access permissions to the page may result in many violations caused by software attempting to access objects other than the target function. This may create a substantial overhead and therefore affect the performance of the protected system.

In contrast to traditional hooking and filtering methods, some embodiments of the present invention allow unified, selective and efficient manner of notifying security software about the occurrence of a broad variety of events during execution of guest software. Some embodiments do not require placing code hooks or changing memory access permissions, but rely instead on a dedicated processor instruction, which may be used by legitimate software (e.g. the operating system) to deliver event notifications. Developing and maintaining conventional event filtering capabilities, such as the Windows® minifilters, requires a substantial effort on the part of software developers. In contrast, a comparable functionality may be obtained with substantially lower code complexity and cost, by implementing some embodiments of the present invention.

In addition to the event notification instruction, some embodiments also introduce a set of control registers within the processor, the respective registers configured to store parameters that control the manner in which the processor processes an event notification instruction. In some embodiments, a notification activation field allows software such as the security module or a hypervisor executing on the respective host system, to turn the event notification functionality on or off.

Another control field of the event notification register may indicate whether notifications should be delivered outside the monitored virtual machine (e.g. via a VM exit event), or to a handler executing within the respective VM (e.g., via a #VE exception on Intel® platforms). The use of in-VM handlers (such as minivisors on AMD® platforms) may be preferable because such configurations avoid the relatively large computational expense of a VM exit event. However, such configurations may be less secure, since the in-VM handler may be more vulnerable to malicious software executing within the respective VM.

Another field of the control register of the processor may enable or disable event filtering. In some embodiments, event filtering allows computer security software to select a subset of trigger events for which to receive notifications. An additional event selection register of the processor may be used to indicated a current selection of trigger events. The register may have a distinct field (e.g., a bit) for each distinct type of trigger event; an ON value of the respective field may indicate that the respective event will trigger an event notification, while an OFF value may indicate that the respective event is currently not selected to trigger notifications. In some embodiments, when the processor encounters an event notification instruction, it may identify the event being notified (for instance according to an operand of the event notification instruction), and may lookup the respective event type in the event selection register. The processor may then decide not to deliver the respective notification when the current values of the event selection register indicates that the respective type of trigger event is not currently selected to trigger notifications. In some embodiments, a trigger event bitmap indicating trigger events currently selected for notification is stored in memory, instead of on a processor register. In one such example, the trigger event bitmap is part of a VM state object (e.g., VMCS on Intel® platforms, VMCB on AMD® systems). In another example, a pointer to the event selection bitmap is stored within the event notification control register.

By reducing the count of events that trigger notifications, event filtering may substantially reduce the overhead of security monitoring. Also, event filtering gives security software substantial flexibility on the choice of trigger events. Such flexibility may be useful in the constantly-changing world of computer security threats. In some embodiments, the computer security module may select trigger events according to a set of security heuristics; such heuristics may change to accommodate newly discovered security threats. Some embodiments may allow security software to adapt to new threats by being able to change the selection of monitored trigger events.

Some embodiments of the present invention may be adapted and applied to delivering event notifications at the OS level, irrespective of whether the host computer system operates a hardware virtualization platform or not. In one such example, instead of delivering a VM exit or a virtualization exception as part of an event notification, the processor may be configured to deliver another kind of exception that may be handled at kernel level. This may allow translating the mechanisms and methods described herein to delivering notifications for instance from user mode to kernel mode. Therefore, some embodiments may improve and extend existing mechanisms for filtering and analyzing system calls and similar OS functionality.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising a hardware processor and a memory, the hardware processor configured to execute a notification handler and a computer security program, the hardware processor further configured to:
   receive from the memory an event notification instruction forming part of a currently executing process, wherein execution of the process causes an occurrence of a trigger event, wherein the event notification instruction comprises an operator field and an operand field, wherein the operand field comprises an identifier of an event type of the trigger event;
   in response to receiving the event notification instruction, suspend execution of the process; and
   in response to suspending execution of the process, switch to executing the notification handler,
   wherein the notification handler is configured to:
      determine whether an event eligibility condition is satisfied according to the event type of the trigger event,
      in response, when the event eligibility condition is satisfied, insert an event indicator into an event queue, the event indicator indicative of the trigger event, and
      in response to inserting the event indicator into the event queue, instruct the hardware processor to resume execution of the process, and
   wherein the computer security program is configured to:
      in response to the hardware processor resuming execution of the process, remove the event indicator from the queue, and
      determine according to the event indicator whether the occurrence of the trigger event is indicative of a computer security threat.

2. The host system of claim 1, wherein the trigger event comprises a system call.

3. The host system of claim 1, wherein the notification handler is further configured, when the event eligibility condition is not satisfied, to invoke the computer security program while maintaining the suspension of execution of the process.

4. The host system of claim 1, wherein the process executes within a virtual machine exposed on the host system, and wherein the notification handler executes within the virtual machine.

5. The host system of claim 1, wherein the process executes within a virtual machine exposed on the host system, and wherein the notification handler executes outside the virtual machine.

6. The host system of claim 1, wherein the computer security program executes within an execution context of the notification handler.

7. The host system of claim 1, wherein the computer security program is further configured, in preparation for removing the event indicator from the queue, to issue a selected event notification instruction, and wherein the notification handler is further configured to:
   determine whether the hardware processor has executed the selected event notification instruction, and
   in response, when the hardware processor has executed the selected event notification instruction, instruct the hardware processor to switch from performing memory address translations according to a first page table to performing memory address translations according to a second page table.

8. The host system of claim 1, wherein the hardware processor is further configured to:
   in response to receiving the event notification instruction, determine whether a delivery condition is satisfied according to a delivery condition determination value supplied by the computer security program; and
   in response, suspend execution of the process only when the delivery condition is satisfied.

9. The host system of claim 1, wherein the delivery condition determination value indicates whether event notifications are currently enabled, and wherein determining whether the delivery condition is satisfied comprises:
   determining according to the delivery condition determination value whether event notifications are currently enabled, and
   when event notifications are currently enabled, determine that the delivery condition is satisfied.

10. The host system of claim 1, wherein the delivery condition determination value indicates whether trigger filtering is enabled, and wherein determining whether the delivery condition is satisfied comprises:
   determining according to the delivery condition determination value whether trigger filtering is enabled, and
   in response, when trigger filtering is enabled:
      determine whether event notifications are enabled for the event type, wherein determining whether event notifications are enabled for the event type comprises looking up the event type in a trigger selection data structure comprising a plurality of fields, each field of the plurality of fields indicating whether event notifications are currently enabled for a selected type of event corresponding to the each field,
      in response to determining whether event notifications are enabled for the event type, when event notifications are enabled for the event type, determine that the delivery condition is satisfied, and
      in response to determining whether event notifications are enabled for the event type, when event notifications are not enabled for the event type, determine that the delivery condition is not satisfied.

11. A non-transitory computer-readable medium storing processor instructions which, when executed by a hardware processor of a host system, cause the host system to form a notification handler and a computer security program, wherein the hardware processor is configured to:
- receive from a memory of the host system an event notification instruction forming part of a currently executing process, wherein execution of the process causes an occurrence of a trigger event, wherein the event notification instruction comprises an operator field and an operand field, wherein the operand field comprises an identifier of an event type of the trigger event;
- in response to receiving the event notification instruction, suspend execution of the process; and
- in response to suspending execution of the process, switch to executing the notification handler,
- wherein the notification handler is configured to:
  - determine whether an event eligibility condition is satisfied according to the event type of the trigger event,
  - in response, when the event eligibility condition is satisfied, insert an event indicator into an event queue, the event indicator indicative of the trigger event, and
  - in response to inserting the event indicator into the event queue, instruct the hardware processor to resume execution of the process, and
- wherein the computer security program is configured to:
  - in response to the hardware processor resuming execution of the process, remove the event indicator from the queue, and
  - determine according to the event indicator whether the occurrence of the trigger event is indicative of a computer security threat.

12. The computer-readable medium of claim 11, wherein the trigger event comprises a system call.

13. The computer-readable medium of claim 11, wherein the notification handler is further configured, when the event eligibility condition is not satisfied, to invoke the computer security program while maintaining the suspension of execution of the process.

14. The computer-readable medium of claim 11, wherein the process executes within a virtual machine exposed on the host system, and wherein the notification handler executes within the virtual machine.

15. The computer-readable medium of claim 11, wherein the process executes within a virtual machine exposed on the host system, and wherein the notification handler executes outside the virtual machine.

16. The computer-readable medium of claim 11, wherein the computer security program executes within an execution context of the notification handler.

17. The computer-readable medium of claim 11, wherein the computer security program is further configured, in preparation for removing the event indicator from the queue, to issue a selected notification instruction, and wherein the notification handler is further configured to:
- determine whether the hardware processor has executed the selected notification instruction, and
- in response, when the hardware processor has executed the selected notification instruction, instruct the hardware processor to switch from performing memory address translations according to a first page table to performing memory address translations according to a second page table.

18. The computer-readable medium of claim 11, wherein the hardware processor is further configured to:
- in response to receiving the event notification instruction, determine whether a delivery condition is satisfied according to a delivery condition determination value supplied by the computer security program; and
- in response, suspend execution of the process only when the delivery condition is satisfied.

19. The computer-readable medium of claim 18, wherein the delivery condition determination value indicates whether event notifications are currently enabled, and wherein determining whether the delivery condition is satisfied comprises:
- determining according to the delivery condition determination value whether event notifications are currently enabled, and
- when event notifications are currently enabled, determine that the delivery condition is satisfied.

20. The computer-readable medium of claim 18, wherein the delivery condition determination value indicates whether trigger filtering is enabled, and wherein determining whether the delivery condition is satisfied comprises:
- determining according to the delivery condition determination value whether trigger filtering is enabled, and
- in response, when trigger filtering is enabled:
  - determine whether event notifications are enabled for the event type, wherein determining whether event notifications are enabled for the event type comprises looking up the event type in a trigger selection data structure comprising a plurality of fields, each field of the plurality of fields indicating whether event notifications are currently enabled for a selected type of event corresponding to the each field,
  - in response to determining whether event notifications are enabled for the event type, when event notifications are enabled for the event type, determine that the delivery condition is satisfied, and
  - in response to determining whether event notifications are enabled for the event type, when event notifications are not enabled for the event type, determine that the delivery condition is not satisfied.

21. A method of protecting a host system against computer security threats, the host system comprising a hardware processor and a memory, the method comprising:
- employing the hardware processor to receive from the memory an event notification instruction forming part of a process, wherein executing the process would cause an occurrence of a trigger event, the event notification instruction comprising an operator field and an operand field, wherein the operand field comprises an identifier of an event type of the trigger event;
- in response to receiving the event notification instruction, employing the hardware processor to suspend execution of the process;
- in response to suspending execution of the process, employing the hardware processor to determine whether an event eligibility condition is satisfied according to the event type of the trigger event;
- in response, when the event eligibility condition is satisfied, employing the hardware processor to insert an event indicator into an event queue, the event indicator indicative of the trigger event;
- in response to inserting the event indicator into the event queue, employing the hardware processor to resume execution of the process;
- in response to resuming execution of the process, employing the hardware processor to remove the event indicator from the queue; and
- employing the hardware processor to determine according to the event indicator whether the occurrence of the trigger event is indicative of a computer security threat.

* * * * *